United States Patent
Khinouche et al.

(10) Patent No.: US 12,529,627 B2
(45) Date of Patent: Jan. 20, 2026

(54) MONITORING STORED INGESTIBLE PRODUCTS

(71) Applicant: Novolyze Inc., Cambridge, MA (US)

(72) Inventors: Karim-Franck Khinouche, Washington, DC (US); Jérôme Defillon, Heudebouville (FR); Pierre-Alexandre Juan, Bourgogne Franche-Comté (FR); Laure Pujol, Bourgogne Franche-Comté (FR)

(73) Assignee: Novolyze Inc., Cambridge, MA (US)

( * ) Notice: Subject to any disclaimer, the term of this patent is extended or adjusted under 35 U.S.C. 154(b) by 343 days.

(21) Appl. No.: 18/192,779

(22) Filed: Mar. 30, 2023

(65) Prior Publication Data

US 2024/0328908 A1    Oct. 3, 2024

(51) Int. Cl.
*G01N 1/22* (2006.01)
*G01N 33/02* (2006.01)
*G06Q 30/0601* (2023.01)
*G06T 7/00* (2017.01)

(52) U.S. Cl.
CPC ........... *G01N 1/2226* (2013.01); *G01N 33/02* (2013.01); *G06Q 30/0633* (2013.01); *G06T 7/0004* (2013.01); *G06T 2207/30128* (2013.01)

(58) Field of Classification Search
None
See application file for complete search history.

(56) References Cited

U.S. PATENT DOCUMENTS

| | | | | |
|---|---|---|---|---|
| 11,016,634 B2 * | 5/2021 | Agboatwalla | ...... | G06Q 30/0641 |
| 2016/0203591 A1 * | 7/2016 | Justaniah | ...... | F25D 29/00 |
| | | | | 348/89 |
| 2018/0053140 A1 * | 2/2018 | Baca | ...... | G01N 33/02 |
| 2019/0165967 A1 * | 5/2019 | Wallace | ...... | G06Q 10/087 |
| 2019/0226755 A1 * | 7/2019 | Johnston | ...... | G06T 7/0002 |

FOREIGN PATENT DOCUMENTS

| | | | | |
|---|---|---|---|---|
| CN | 101726492 A | * | 6/2010 | |
| CN | 114821575 A | * | 7/2022 | ............. G06N 20/20 |
| JP | 07289291 A | * | 11/1995 | |
| RU | 2767711 C | * | 3/2022 | ............. G01N 33/02 |

\* cited by examiner

Primary Examiner — Daniel S Larkin
(74) Attorney, Agent, or Firm — Lee & Hayes, P.C.

(57) ABSTRACT

Provided herein are techniques, devices, and systems for monitoring an ingestible product stored in a storage receptacle with regards to at least its safety for ingestion. A computing system may receive, from multiple different data sources, data associated an ingestible product stored in a storage receptacle. Based on the data, the computing system may determine a metric associated with the ingestible product, the metric indicative of a probability of the ingestible product being safe to ingest. Based on the metric, the computing system may cause information to be output via a user device, wherein the information indicates whether the ingestible product is safe to ingest.

20 Claims, 5 Drawing Sheets

MONITORING STORED INGESTIBLE PRODUCTS

BACKGROUND

Many consumers store food in their homes, such as in refrigerators, freezers, and pantries. Food products have an expiration, after which the food may spoil. Spoiled food, and/or food that is not fresh, often has an unpleasant taste and/or smell. Moreover, a consumer is at risk of getting sick from eating spoiled food. Sometimes it is difficult for a consumer to tell whether a food product is spoiled before they eat the food. Accordingly, a large amount of food is wasted by consumers who do not eat food before it expires and/or by consumers who discard unexpired food products out of a fear of getting sick or otherwise eating food that is not fresh. The disclosure made herein is presented with respect to these and other considerations.

DETAILED DESCRIPTION

Figure 1:
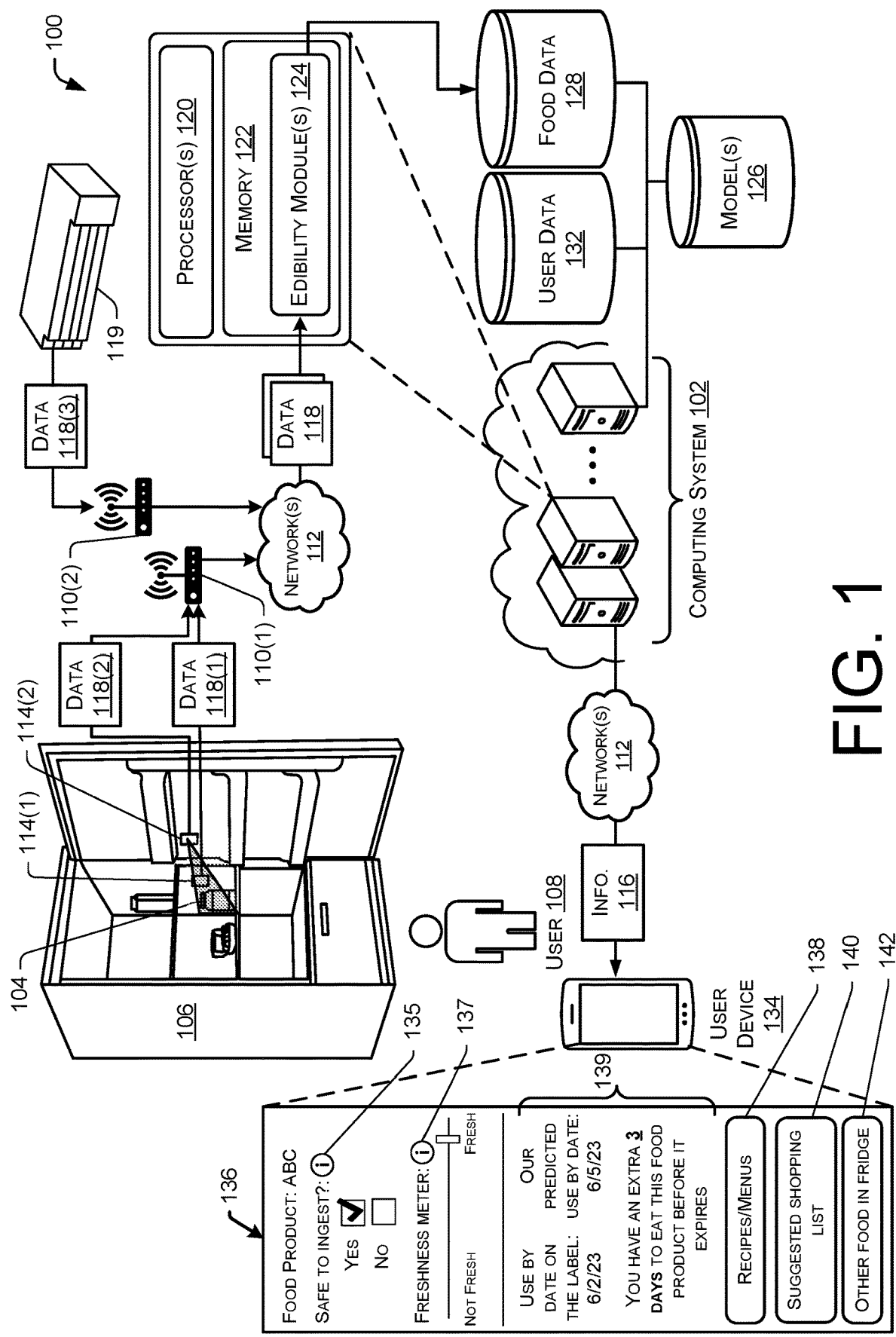
FIG. 1 illustrates an example platform including an example computing system configured to determine whether an ingestible product stored in a storage receptacle is safe to ingest.

Described herein are, among other things, techniques, devices, and systems for monitoring an ingestible product(s) stored in a storage receptacle with regards to at least its safety for ingestion. In some examples, the ingestible product may be a food product. In these examples, a user may store one or more food products in a storage receptacle. The storage receptacle can be a temperature-controlled storage receptacle, such as a refrigerator, a freezer, or the like. The user can be an end consumer who stores food products in their home, or the user can be a restaurant worker who works at a restaurant where food products are stored, a grocery store worker who works at a grocery store where food products are stored, a factory worker at a food processing facility where food products are stored, or the like. In any of these examples, the stored food products have an expiration, after which the food may spoil. As mentioned above, spoiled food, and/or food that is not fresh, often has an unpleasant taste and/or smell, and consumers who ingest food that is spoiled may get sick. For example, if a pathogen grows in the stored food product to contaminate the food product, a consumer who ingests the contaminated food product may get food poisoning, which can manifest in one or more symptoms, such as cramping, nausea, vomiting, diarrhea, or the like. A "pathogen," as used herein, can be a bacterium, a virus, or another organism (e.g., a parasite) or microorganism (e.g., a microbe) that can cause disease. While food poisoning can be mild, some foodborne diseases may result in hospitalization and/or death. Accordingly, populations (e.g., humans, animals, etc.) face a significant public health burden if the ingestion of contaminated food products is not prevented.

The techniques, devices, and systems described herein provide a platform that is configured to monitor a stored food product by receiving, from multiple different data sources, data associated with the food product stored in a storage receptacle, and by determining, based at least in part on the data, a metric associated with the food product. The metric can be indicative of a probability of the food product being safe to ingest and is sometimes referred to herein as a "safety metric." The safety metric may be indicative of one or more food safety criteria being satisfied. In some examples, the metric may be a growth metric that measures growth of a pathogen(s) in the food product, sometimes expressed in terms of the log transformation of the colony forming units (log CFU/g) of a specific pathogen.

The techniques, devices, and systems described herein utilize a data fusion (e.g., sensor fusion) approach for monitoring an ingestible product(s) (e.g., a food product(s)) stored in a storage receptacle with regards to at least its safety for ingestion. For example, first data associated with a food product may be received from a first device within a storage receptacle. Second data associated with the food product may also be received from a different data source, such as a second device within the storage receptacle. In an illustrative example, the first data may represent image data of the food product and generated by a camera (an example of the first device) within the storage receptacle, and the second data may represent temperature data associated with the food product and generated by a temperature sensor (an example of the second device) within the storage receptacle. The first data (e.g., image data) and the second data (e.g., temperature data) may be processed using a data fusion model to determine at least a safety metric associated with the food product, the safety metric indicating a probability of the food product being safe to ingest. The data fusion approach described herein allows for determining a safety metric (and potentially an additional metric(s)) associated with a food product with improved accuracy and/or consistency, as compared to relying on data from a single data source.

The disclosed platform is further configured to cause information to be output via a user device based at least in part on the safety metric, the information indicating whether the food product is safe to ingest. Accordingly, a user who is viewing the information output via the user device is able to make an informed decision as to whether and when to ingest (e.g., consume) the food product, or to otherwise discard the food product if the information indicates that the food product is not safe to ingest. That is, the disclosed platform allows a user to confirm that a food product stored in a storage receptacle is safe to ingest before the food product is ingested by the user or by another consumer(s). The techniques, devices, and systems described herein can improve existing technologies used in the food industry for notifying users regarding the expiration of food products and/or their potential spoilage (or even their lack of freshness) by providing users with more food safety information (and potentially food freshness information). This information is more up-to-date than a label printed on a food product package because the information is based on data associated with the food product that is received after the food product is produced and sold for consumption, and because data may be received on a continual basis over time, as the food product remains stored in the storage receptacle. The disclosed techniques, devices, and systems also allow for providing food safety information (and potentially food freshness information) in a more conspicuous manner to an end user and in a manner that is more readily available to an end user, as compared to a printed label on the packaging of the food product. For example, the user can view food safety information about a food product on a user device (e.g., a handheld smart phone) without opening the storage receptacle to look at a label printed on the food product's packaging. Due to these and other advantages of the disclosed technology, instances of food poisoning or other food-borne illnesses can be reduced or mitigated across the general population.

To illustrate, a user may purchase a carton of milk at the grocery store. Upon returning home, the user may open the carton of milk to consume some of the milk, and the user may subsequently place the opened carton of milk in the refrigerator. The refrigerator may be equipped with one or more devices configured to generate data associated with the carton of milk stored in the refrigerator. For example, a camera may capture one or more images of the carton of milk, a gas sensor may detect a concentration of a gas(es) emanating from the milk that is/are indicative of an odor associated with the milk, a temperature sensor may detect a temperature of the milk in the carton, and so on. These devices may send (e.g., stream) data over a network(s) to a remote computing system that is configured to determine, based on the data (and potentially based on additional data associated with the food product that is available to the remote computing system and received from yet another data source(s)), a safety metric associated with the milk in the user's refrigerator, the safety metric indicative of a probability of the milk being safe to ingest. As described in more detail below, this safety metric can be determined using a data fusion approach based on the data received from various data sources, such as the data received from the camera, the data received from the gas sensor, and/or the data received from the temperature sensor described above and elsewhere herein. This data fusion approach allows for determining the safety metric associated with the milk with improved accuracy and/or consistency, as compared to relying on data from a single data source and/or the user relying solely on an expiration date printed on the milk carton. In other words, a determination that the milk is safe (or unsafe) to ingest can be made with higher confidence due to the availability of multiple different types of data from multiple different data sources. Information indicative of whether the milk is safe to ingest can then be output via a user device of the user, such as on a display of the user device (e.g., via a user interface of an application downloaded to the user device). If the information indicates that the milk is safe to ingest, the user can make an informed decision to consume the milk, as opposed to relying on a visual inspection of the milk in the carton and/or smelling the milk. In some examples, the information may indicate an expiration date or a time remaining until the expiration date so that the user can plan to use the milk in advance of its expiration. Notably, the expiration date may be determined as part of the safety metric described herein, and, therefore, the expiration date determination described herein is more reliable that an expiration date that is printed on the carton of milk and often estimated well in advance of the purchase date of the milk. In some cases, food may spoil quicker than anticipated, and, as such, the information output via the user device can inform the user regarding a shortened lifespan of the food product determined by the platform, which allows the user to better plan for the consumption of the food product before it expires. In some examples, the information may indicate a food preparation recommendation, such as a recipe for using the food product. In this way, the user is incentivized to use the food product before it expires.

The techniques, devices, and systems described herein reduce food waste by informing a user about the safety (and potentially the freshness) of a food product stored in a storage receptacle in a readily accessible, conspicuous way. Accordingly, food waste can be reduced by increasing the likelihood of food being consumed, and by reducing the likelihood of food being discarded, before it expires. Reduction of food waste, in turn, conserves resources, such as power resources (e.g., energy), processing resources, memory resources, networking resources, and the like, which would otherwise be used to dispose of food waste. For example, less food waste means fewer garbage trucks collecting food waste, and/or less frequent garbage pickups, and/or a reduced amount of food waste being disposed in a landfill, for example.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, mobile telephone devices, tablet computing devices, special-purposed hardware devices, network appliances, and the like. The configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 illustrates an example platform 100 including an example computing system 102 configured to determine, among other things, whether an ingestible product 104 stored in a storage receptacle 106 is safe to ingest. The ingestible product 104 is often referred to herein as a "food product 104" to denote food that is ingestible. However, it is to be appreciated that the ingestible product 104 is not limited to food despite numerous references to "food product 104" herein. FIG. 1 depicts a storage receptacle 106 in the form of a refrigerator where food products 104 are stored, typically at a temperature that is lower than the ambient temperature of the environment of the storage receptacle 106. Accordingly, in at least some examples, the storage receptacle 106 can be a temperature-controlled storage receptacle 106, such as a refrigerator, a freezer, or the like. In the case of a refrigerator, for example, the temperature inside of the storage receptacle 106 can be maintained at a temperature within a range of about 2 to 8 degrees Celsius (° C.). In the case of a freezer, the temperature inside of the storage receptacle 106 can be maintained at lower temperatures, such as temperatures of about −20 to −18° C. In some examples, the storage receptacle 106 can be a pantry, a cupboard, or any other suitable type of storage receptacle found in a home, an office, or a similar structure where food products 104 might be stored. In such an example, the pantry, cupboard, or the like may be considered to be a temperature-controlled storage receptacle 106 in the case where a temperature within the home, office, or similar structure where the storage receptacle 106 is located is controlled using a thermostat and a heating/cooling system (e.g., a furnace, an air conditioning system, etc.). In other words, a pantry, cupboard, or the like is typically maintained at a controlled temperature, which is the same temperature as other areas (e.g., rooms, closets, etc.) of the home, office, or similar structure where the storage receptacle 106 is located. In some examples, the storage receptacle 106 may not be temperature-controlled, at least in an "active" control sense, even though temperature of the storage receptacle 106 may be passively controlled using insulating materials, etc. In such examples, the temperature within the storage receptacle 106 can vary with variations in the ambient temperature of the environment outside of the storage receptacle 106. In at least one example, the storage receptacle 106 can be an underground bunker where an emergency supply of food products 104 is stored. It is to be appreciated that such an underground bunker may or may not be a temperature-controlled storage receptacle 106.

In the example of FIG. 1, a user 108 of the storage receptacle 106 may represent an end consumer of a food supply chain. Accordingly, the user 108 may have purchased food products 104 at a grocery store and stored the food products 104 in the storage receptacle 106 after arriving home from the grocery store. However, it is to be appreciated that the user 108 is not limited to an end consumer, and it is also to be appreciated that the storage receptacle 106 does not have to be situated in a home or a similar dwelling. For instance, the user 108 may represent a restaurant worker who works at a restaurant where food products 104 are stored in the storage receptacle 106 (e.g., a refrigerator or freezer in the kitchen or another storage room of the restaurant). In this example, the food products 104 may represent food products 104 that are used to prepare meals for customers of the restaurant, and/or the food products 104 may represent meals that have been prepared for customers and are placed in the storage receptacle 106 until the food products 104 are served to the customers of the restaurant. As another example, the user 108 may represent a grocery store worker who works at a grocery store where food products 104 are stored in the storage receptacle 106 (e.g., a refrigerated section/area at the back of the grocery store). In this example, the food products 104 may represent food products 104 that are to be placed on display units and/or shelves in the grocery store. As another example, the user 108 may represent a factory worker at a food processing facility where food products 104 are stored in the storage receptacle 106 (e.g., a refrigerated storage room of the food processing facility). In this example, the food products 104 may represent food products 104 that are to be, or that have already been, processed within the facility for distribution to a downstream customer, such as a grocery store, a restaurant, or the like.

It can be appreciated that the types of food products 104 that are stored in the storage receptacle 106 may vary. For instance, the food product 104 stored in the storage receptacle 106 can be any suitable type of food product, such as a meat product, a vegetable product, a fruit product, a dairy product, a beverage product, a grain-based food product (e.g., cereal, snack bars, etc.), a dessert product, a food ingredient (e.g., flour, sugar, cocoa, etc.), or the like. It is also to be appreciated that a food product may be in solid form, liquid form, including powders, flours, or any other suitable form. As such, the term "food product" can mean beverages or drinks, in some examples. Furthermore, the stored food products 104 have an expiration, after which the food may spoil. Printing expiration dates on food product packaging is known, but such information provides the user 108 with a very rough estimate of when a food product 104 will expire and the actual expiration of the food product depends on how the food product 104 is stored (which varies from user-to-user), among other things. Accordingly, with only the expiration date printed on the package of a food product, the user 108 is left guessing as to whether the food product 104 is actually safe to ingest, and/or whether the food product 104 is close to spoilage. The techniques, devices, and systems described herein address these and other issues.

FIG. 1 depicts one or more devices 110(1) and/or 110(2) (collectively 110), which may represent an access point (e.g., a wireless router, a hub device dedicated to interfacing with devices in the storage receptacle 106, etc.). The device(s) 110 is often referred to herein as a "gateway device(s) 110" to denote a device that is used to connect two different networks, such as a sensor network in the storage receptacle 106 and the Internet. However, it is to be appreciated that the device(s) 110 is not limited to a gateway device despite numerous references to "gateway device(s) 110" herein. The gateway device 110(1) may be disposed in the environment of the storage receptacle 106, such as within a structure (e.g., a home of the user 108) where the storage receptacle 106 is located or outside of the structure. The gateway device(s) 110 can be implemented as any type and/or any number of computing devices, including a personal computer (PC), a laptop computer, a desktop computer, a mobile phone, tablet computer, a server computer, a router, an access point, or any other electronic device that can transmit data to, and receive data from, other devices, such as over a wired network(s) and/or wireless network(s). Accordingly, FIG. 1 depicts the gateway device(s) 110 as being coupled to a network(s) 112, which may represent, or include, any type of public or private network, such as a wide-area network, such as the Internet, data and/or voice networks, a wired infrastructure (e.g., coaxial cable, fiber optic cable, etc.), a wireless infrastructure (e.g., radio frequencies (RF), cellular, satellite, etc.), and/or other connection technologies. In some examples, the gateway device(s) 110 is configured to establish an authenticated (e.g., encrypted) session with the computing system 102 over the network(s) 112. In examples, secure socket layer (SSL) or transport layer security (TLS) protocol is utilized for communication between the gateway device(s) 110 and the computing system 102. In examples, a virtual private network (VPN) is utilized to establish the authenticated session between the gateway device(s) 110 and the computing system 102. It is to be appreciated, however, that any suitable type of network access technology can be utilized.

The gateway device 110(1) may be connected to devices 114 within the storage receptacle 106. Such a connection may be a wired connection or a wireless connection. In some examples, the devices 114 within the storage receptacle 106 may include one or more sensors, such as cameras, temperature sensors, gas sensors, humidity sensors, pressure sensors, pH sensors, and the like. The gateway device 110(1) may be configured to collect data 118 from any suitable device 114 within the storage receptacle 106 and outside of the storage receptacle 106, and from any suitable number of devices 114. In order to collect data 118, the gateway device 110(1) may interface with the devices 114 (e.g., by plugging a wire cable into the gateway device 110(1) and the devices 114, by the gateway device 110(1) establishing a wireless connection with the devices 114, etc.), as the devices 114 are generating data 118 associated with the food products 104 stored in the storage receptacle 106.

FIG. 1 depicts two devices 114(1) and 114(2) within the storage receptacle 106, but there can be fewer devices 114 (e.g., a single device 114) or more devices 114 (e.g., more than two devices 114) within the storage receptacle 106. In an example, a device(s) 114 within the storage receptacle 106 may be a camera(s) or any other similar type of image capture device that is configured to capture images of food products 104 stored in the storage receptacle 106. Such a camera(s) may capture still images and/or video footage of a food product(s) 104 stored in the storage receptacle 106. In some examples, the camera(s) is/are aimed at a particular food product 104 stored in the storage receptacle 106, such as a jar of jelly. Accordingly, the data 118 (e.g., image data) generated by the camera(s) represents one or more images of the particular food product 104, wherein other food products may not be in the field of view of the camera(s). In some examples, the camera(s) is positioned such that multiple food products 104 in the storage receptacle 104 are in the field of view of the camera(s), and the image data generated by the camera(s) represents one or more images of the multiple food products 104. In some examples, multiple cameras are situated in different positions to capture imagery of a food product 104 from different angles, and the corresponding image data generated by the multiple cameras may provide multiple views of the food product 104, such as a 360-degree view of the food product 104. The camera(s) may be a red, green, blue (RGB) camera(s) to capture color imagery, which may be useful in determining a color(s) of a food product(s) 104 and/or changes in the color(s) of a food product(s) 104 over time.

In another example, a device(s) 114 within the storage receptacle 106 may be a temperature sensor(s). In some examples, such a temperature sensor may be a thermometer that is in contact with the food product 104 (e.g., the user 108 may ensure that the thermometer is in contact with the food product 104 when the food product 104 is placed in the storage receptacle 106), or a contactless thermometer that is in proximity to (e.g., within a threshold distance of) the food product 104 to detect a temperature of the food product 104. In some examples, the temperature sensor(s) may be a contactless infrared temperature sensor. The temperature sensor(s) may sense the temperature of a food product(s) 104 and generate data 118 (e.g., temperature data) that indicates the temperature of the food product(s) 104. In some examples, the temperature sensor is configured to generate temperature data that indicates a temperature profile of the food product 104, such as a profile of multiple temperature values at different points along a cross-section of the food product 104 at any given time. Consider, for example, a frozen steak that is placed in the storage receptacle 106 (e.g., a refrigerator) in order to thaw. It may be the case that the center of the steak remains frozen (e.g., at a lower temperature(s)) longer than the outer surface of the steak. In this case, there may be a temperature gradient from the center of the steak where the temperature is lower to the outer surface of the steak where the temperature is higher, and the temperature sensor may be configured to detect such a range of temperatures associated with the food product 104 using, for example, infrared temperature sensing technology. In some examples, the temperature and/or the cooling/heating of the storage receptacle 106 can be adjusted dynamically, such as by the computing system 102 sending an instruction to a local processor of the storage receptacle 106 to adjust the temperature inside of the storage receptacle 106. The adjustment of the temperature inside of the storage receptacle 106 may be based on temperature data generated by the temperature sensor(s) in the storage receptacle 106. For example, the user 108 might place a hot meal in the storage receptacle 106, which might affect the temperature of the other food products 104 around the hot meal. In this example, in order to "protect" these other food products 104 from heating up, which may accelerate the expiration date of those food products 104, the temperature of the storage receptacle 106 may be reduced or adjusted to a lower temperature. In some examples, the adjustment of the temperature within the storage receptacle 106 may be proactive, as opposed to reactive. For instance, if the user 108 ordered food for delivery to their home, this shipment data may be obtained by the computing system 102 and used to proactively lower the temperature inside the storage receptacle 106 in anticipation of room-temperature (or warm, hot, etc.) food being placed in the storage receptacle 106. Again this may be a protective measure to prevent other food products 104 in the storage receptacle 106 from warming/heating, which may truncate the shelf life of those food products 104.

In yet another example, a device(s) 114 within the storage receptacle 106 may be a gas sensor(s). In some examples, such a gas sensor(s) may sense a concentration of one or more gases emanating from a food product 104 and generate data 118 (e.g., gas data) that indicates the gas(es) and/or the concentration(s) (e.g., partial pressures) thereof, which, in turn, may be indicative of an odor (or a smell) of the food product 104. In some examples, such a gas sensor(s) may be positioned in proximity to (e.g., within a threshold distance, such as a few inches, of) the food product 104 to ensure that a substantial portion of the gas(es) detected by the gas sensor(s) are those emanating from the food product 104 of interest, and not from another food product or another gas source in the storage receptacle 106.

In general, the data 118 collected by the gateway device(s) 110 may include any suitable type of data, such as the image data, temperature data, and/or gas data mentioned above with specific reference to the corresponding sensors that may be disposed in the storage receptacle 106. For example, the first data 118(1) shown in FIG. 1 may represent image data corresponding to one or more images of a food product(s) 104, and the second data 118(2) may represent temperature data and/or gas data associated with a food product(s) 104, just to name a few different examples of types of data that may be received by the gateway device 110(1). In some examples, the gateway device 110(1) is configured to receive additional data 118 from other data sources in the environment of the storage receptacle 106 and/or other data sources remotely located with respect to the storage receptacle 106. For example, the gateway device 110(1) may receive data (e.g., image data) from a user device 134 (described in more detail below) of the user 108.

For example, the user 108 may capture one or more images of a food product 104 using a camera of the user device 134. This could allow for collecting data 118 about a food product 104 at times when the food product 104 is not disposed in the storage receptacle 106 (e.g., after the user 108 removes the food product 104 from the storage receptacle 106 and before the user 108 places the food product 104 back in the storage receptacle 106). In some examples, an application downloaded to the user device 134 may prompt the user 108 to capture images (e.g., take pictures) of food products 104 that the user 108 removes from the storage receptacle 106 to maximize the benefits of the platform 100. For example, and as described in more detail below, one or more of the devices 114 (e.g., sensors, such as a camera(s)) in the storage receptacle 106 may be configured to detect when a food product 104 has been placed in the storage receptacle 106 and/or when a food product 104 has been removed from the storage receptacle 106. In such a configuration, a detection that a food product 104 has been removed from the storage receptacle 106 may trigger one or more (e.g., periodic) prompts via the user device 134 that prompt the user 108 to capture images of the food product 104 while the food product 104 is outside of the storage receptacle 106, and the corresponding image data may be sent by the user device 134 to the computing system 102 over the network(s) 112 (e.g., via the gateway device 110(1)).

In some examples, the computing system 102 may access food production data 118(3) associated with a food product(s) 104 stored in the storage receptacle 106. Such food production data 118(3) may be accessed from a food processing facility 119 (or a computing system associated therewith) where the food product(s) 104 was processed. The gateway device 110(2) may be connected to one or more devices within the facility 119 in order to access the data 118(3). Further, it is to be appreciated that similar data may be accessed from one or more additional facilities like the facility 119 depicted in FIG. 1. In an illustrative example, a food processing facility 119 may have produced cheese from cow's milk, and during this food production process, a computing system (e.g., the computing system 102) may have collected food production data 118(3) associated with the cheese, such as contaminant data indicating a level(s) of a contaminant(s) (e.g., a pathogen(s), a non-pathogen contaminant(s), etc.), food treatment data, such as temperature data indicative of a temperature of the cheese being heat treated, food data indicating a characteristic(s) (e.g., color, texture, moisture content, weight, mass, size/volume, and/or pH) of the cheese produced in the facility 119, storage data indicating a storage condition(s) of the cheese, or the like. Such food production data 118(3) can be factored into the data fusion analysis described herein, in combination with data 118(1), 118(2), etc. received from the device(s) 114 in the storage receptacle 106. In some examples, the data 118 collected by the gateway device 110(2) may include food transport data (e.g., temperature data, image data, etc.) associated with the food product 104 and generated during transportation of the food product 104 to a retailer (e.g., a grocery store, a restaurant, etc.) where the food product 104 is to be purchased by end consumers, such as the user 108. In some examples, the data 118 collected by the gateway device 110(2) may include food storage data (e.g., temperature data, image data, etc.) associated with the food product 104 and generated while the food product 104 is stored at a retailer until the food product 104 is purchased by an end consumer, such as the user 108. In other words, data 118 may be collected at one or more times and from one or more data sources at any point(s) along the food supply chain from a time of producing (e.g., harvesting, processing, etc.) the food product 104 to a time at which the food product 104 is purchased by an end consumer, such as the user 108. Besides using such data to determine a safety metric and/or a freshness metric associated with the food product 104, as described herein, the data collected along the food supply chain may enable providing more transparency to end consumers in regard to the provenance of the food product 104 and/or what happened to the food product 104 along the food supply chain.

The gateway device(s) 110 may be configured to reshape the collected data 118, such as by compiling, normalizing, or otherwise reformatting the data 118, and to send the data 118 to the computing system 102 over the network(s) 112. In some examples, the gateway device(s) 110 is configured to generate messages that contain the data 118, and the gateway device(s) 110 may send the messages to the computing system 102 over the network(s) 112. Moreover, the data 118 (e.g., messages containing the data 118) can be sent in real-time (e.g., streamed) as data is collected and processed by the gateway device(s) 110, or the data 118 can be held (e.g., buffered) for a period of time and subsequently sent periodically to the computing system 102. For example, the data 118 can be sent by the gateway device(s) 110 to the computing system 102 in batches of data at regular intervals, or whenever a network connection is available, or whenever bandwidth is above a threshold, or in response to events (e.g., in response to collecting a threshold amount of data from devices 114 within the storage receptacle 106, in response to detecting that a food product 104 has been placed in the storage receptacle 106, etc.).

In the illustrated implementation, the computing system 102 includes one or more processors 120, and memory 122 (e.g., computer-readable media 122) storing at least an edibility module(s) 124. In some implementations, the processors(s) 120 may include a central processing unit (CPU) (s), a graphics processing unit (GPU) (s), both CPU(s) and GPU(s), a microprocessor, a digital signal processor or other processing units or components known in the art. Alternatively, or in addition, the functionally described herein can be performed, at least in part, by one or more hardware logic components. For example, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 120 may possess its own local memory, which also may store program modules, program data, and/or one or more operating systems.

The memory 122 may include volatile and nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, compact disk (CD)-ROM, digital versatile disks (DVD) or other optical storage, magnetic cassettes, magnetic tape, magnetic disk storage or other magnetic storage devices, redundant array of inexpensive disks (RAID) storage systems, or any other medium which can be used to store the desired information and which can be accessed by a computing device. The memory 122 may be implemented as computer-readable storage media (CRSM), which may be any available physical media accessible by the processor(s)

120 to execute instructions stored on the memory 122. In one basic implementation, CRSM may include RAM and Flash memory. In other implementations, CRSM may include, but is not limited to, ROM, EEPROM, or any other tangible medium which can be used to store the desired information and which can be accessed by the processor(s) 120.

The computing system 102 can be located remotely from the gateway device(s) 110. The computing system 102 may, in some instances, be part of a network-accessible computing platform that is maintained and accessible via a wide area network. Network-accessible computing platforms such as this may be referred to using terms such as "on-demand computing", "software as a service (Saas)", "platform computing", "network-accessible platform", "cloud services", "data centers", and so forth. In this manner, the computing system 102 may be configured to provide particular functionality to large numbers of gateway devices 110 associated with different, geographically-disparate storage receptacles 106.

In general, the computing system 102 may include logic (e.g., software, hardware, and/or firmware, etc.) that is configured to implement the techniques, functionality, and/or operations described herein. The memory 122, for example, can include various modules, such as instructions, datastores, and so forth, which may be configured to execute on the processor(s) 120 for carrying out the techniques, functionality, and/or operations described herein. An example functional module in the form of an edibility module(s) 124 is shown in FIG. 1.

The computing system 102 is configured to receive the data 118 (e.g., messages containing the data 118) from the gateway device(s) 110 and/or the user device 134 over the network(s) 112, as shown in FIG. 1. The edibility module(s) 124 is configured to process the data 118 (e.g., messages containing the data 118) received from the gateway device(s) 110 and/or the user device 134. Processing the data 118 (e.g., messages containing the data 118) by the edibility module(s) 124 is described in more detail below with reference to the following figures. In general, the data 118 can be used to determine (e.g., estimate) a metric(s) associated with the food product 104, such as a safety metric and/or a freshness metric. The safety metric is indicative of a probability of the food product 104 being safe to ingest. The freshness metric is indicative of a freshness of the food product 104. The safety metric may relate to a condition of the food product 104 that poses a threat to the health of a human or an animal that consumes the food product 104. For example, the food product 104, if contaminated with a pathogen (e.g., *Salmonella, Listeria*, etc.), may cause disease after the food product 104 is consumed by a human or an animal. The freshness metric, by contrast, may relate to a quality of the food product 104, which generally degrades over time for most food products, some food products degrading in quality faster than others. For example, a flavor, smell, texture, and/or appearance of a food product 104 may change with the passage of time as spoilage microorganisms (e.g., bacteria) digest the fibers of the food product 104. This change in flavor, smell, texture, and/or appearance is generally disfavored in that most humans and animals prefer consuming a fresh food product over a food product that is not fresh.

The interplay between safety and freshness can vary. For example, any given food product 104 may be in one of four general conditions: (i) safe and fresh, (ii) safe but not fresh, (iii) fresh but not safe, or (iv) neither safe nor fresh. An example of a food product 104 that is safe but not fresh is wilted salad. In this example, by consuming wilted salad, a human may not get sick, but the quality of the wilted salad is impacted by the spoilage microorganisms that have digested some of the fibers, making it limp, soggy, and/or giving the salad a brown coloration. An example of a food product 104 that is fresh but not safe is steak tartare that is contaminated with *Listeria*. A human may not notice the *Listeria* on the meat they are about to consume, and the meat may smell and taste fine to the consuming human, but ingestion of the contaminated meat will likely cause food poisoning in the consuming human.

In some examples, the safety metric and the freshness metric may be determined based on different sets of data and/or different types of data. For example, temperature data indicating the storage temperature of a food product 104 may be more indicative of the safety of the food product 104, as compared to other types of data, because variations in the storage temperature of the food product is one of the more influential factors of pathogen growth. Meanwhile, image data indicating the appearance of a food product 104 and/or gas data indicating a smell of the food product 104 may be more indicative of the freshness of the food product 104, as compared to other types of data, because a change in appearance and/or smell is often correlated with a degradation in freshness. In some examples, the computing system 102 may store one or more models 126 that are usable to estimate the safety metric and/or the freshness metric. In some examples, each model 126 may be specific to a food product 104. For example, a first model 126 may be specific to a certain type of meat product, a second model 126 may be specific to a certain type of dairy product, and so on.

In some examples, the model(s) 126 may represent, or include, a mathematical model(s) that define(s) one or more equations including parameters. In some examples, such mathematical models include parameters that are usable for modeling the growth of a pathogen in the food product 104 as a function of temperature and/or time. These pathogen growth model(s) may be developed based on lab trials and/or studies conducted with respect to the food product 104 and a target pathogen. The studies can evaluate various parameters, such as differing temperatures at a constant duration, differing durations at a constant temperature, or combinations thereof to determine whether, and at what rate, a target pathogen grows in a particular food product 104 under various conditions.

In some examples, the model(s) 126 may represent, or include, a machine learning model(s). Machine learning generally involves processing a set of examples (called "training data") in order to train a machine learning model(s). A machine learning model(s), once trained, is a learned mechanism that can receive new data as input and estimate or predict a result as output. For example, a trained machine learning model can be a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model can be trained to infer a probability, or a set of probabilities, for a classification task based on unknown data received as input. In the context of the present disclosure, the unknown input may include the data 118 associated with a food product 104 stored in a storage receptacle 106, and the trained machine learning model(s) may be tasked with estimating a safety metric associated with the food product 104 and/or a freshness metric associated with the food product 104. For example, the trained machine learning model(s) may be configured to output a classification or a score that indicates, or otherwise relates to, a probability of the food product 104 being safe to ingest. As another example, the trained machine learning model(s) may be configured to output a classification or a score that indicates, or otherwise relates to, a freshness of the food product 104. In some examples, the trained machine learning model(s) may be configured to output a classification or a score that indicates, or otherwise relates to, a probability of the food product 104 being classified in one of multiple classes indicative of a safety of the food product 104 or a freshness of the food product 104. For instance, the score output from the trained machine learning model(s) may relate to a probability of the food product 104 being safe to ingest or not safe to ingest, fresh or not fresh, etc. The data 118 provided as input to the trained machine learning model may include image data representing an image(s) of a food product 104 stored in the storage receptacle 106. Accordingly, the trained machine learning model(s) may be trained on image data of food products. Accordingly, the data 118 (e.g., image data) provided as input to the trained machine learning model(s) can be classified according to the type of food product 104 (e.g., meat, vegetable, fruit, diary, etc.). The image data may also include various features indicative of freshness and/or spoilage, such as a color(s) of the food product 104, a characteristic of the food product 104 (e.g., whether a container, such as a jar, a carton, etc., is opened or closed, whether the food product 104 is partially consumed or not yet consumed, a consistency of the food product 104, transparency (e.g., cloudy, clear, etc.) of the food product 104, whether the food product 104 has features (e.g., spots, etc.) indicative of mold growth, etc.). The data 118 provided as input to the trained machine learning model may additionally, or alternatively, include gas data, temperature data, or any other data described elsewhere herein as being accessible to the computing system 102. The trained machine learning model(s) may represent a single model or an ensemble of base-level machine learning models, and may be implemented as any type of machine learning model. For example, suitable machine learning models for use by the techniques and systems described herein include neural networks (e.g., deep neural networks (DNNs), recurrent neural networks (RNNs), etc.), tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof. An "ensemble" can include a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble. Accordingly, a trained machine learning model can be stored by the computing system 102 as a model 126.

In some examples, using a data fusion approach to determine a safety metric and/or a freshness metric, the model 126 may represent, or include, a model of weights that assigns different weights to different types of data 118 received from different data sources based at least in part on the reliability of the data. For example, a model of weights may assign a first weight to the first data 118(1) shown in FIG. 1, the first weight indicative of a reliability of the first data 118(1) and/or a first device 114(1) and/or technology utilized to generate the first data 118(1), a second weight to the second data 118(2), the second weight indicative of a reliability of the second data 118(2) and/or a second device 114(2) and/or technology utilized to generate the second data 118(2), and so on for any suitable number of different types of data 118 received from different data sources. The model 126 may then be used to compute the safety metric and/or the freshness metric associated with the food product 104 based at least in part on the different weights, such as by computing a weighted average or a similar statistical metric. To illustrate, a first safety metric may be determined based on image data received from a camera(s) within the storage receptacle 106, a second safety metric may be determined based on temperature data received from a temperature sensor(s) within the storage receptacle 106, a third safety metric may be determined based on gas data received from a gas sensor(s) within the storage receptacle 106, and so on. A weighted average may then be computed by multiplying the respective safety metrics by their associated weights, summing those resultant values and dividing the sum by the number of data sources or the number of different types of data to obtain a weighted average that represents an overall safety metric that accounts for the different types of data received from the different data sources and the respective reliabilities of each.

Regarding the gas data in particular, a trained machine learning model may be used to classify the gas data in one of multiple classes indicative of an odor (or a smell) of the food product 104. For example, gas data may be provided as input to the trained machine learning model, and the trained machine learning model(s) may be tasked with outputting a classification or a score that indicates, or otherwise relates to, an odor (or a smell) of the food product 104. For instance, the score output from the trained machine learning model(s) may relate to a probability of the food product 104 having a spoiled smell or not spoiled (fresh) smell.

Thus, using the data 118, and, in some cases, the model(s) 126, the computing system 102 may repeatedly determine safety metrics and/or freshness metrics associated with food products 104 that are stored in the storage receptacle 106. As safety metrics and/or freshness metrics are determined by the edibility module(s) 124, the metrics can be stored as food data 128. In addition, the raw data 118 received from the gateway device(s) 110 and/or the user device 134 may be stored as the food data 128. In a machine learning example, a model 126 can be trained using a sampled subset of this food data 128. In general, the training data that is used to train the machine learning model(s) 126 can be any suitable data obtained from any suitable data source. In some examples, the training data includes external data with respect to the platform 100, such as data that is obtained from a third-party data source. In another example, the training data includes at least a subset of raw and/or processed data 118 collected from devices 114 within storage receptacles 106 and/or devices within facilities 119.

In some examples, the safety metrics and/or freshness metrics determined by the edibility module(s) 124 can be used to classify the food product 104 as one of multiple class labels indicative of a safety of the food product 104 in terms of whether the food product 104 is safe to ingest and/or as one of multiple class labels indicative of a freshness of the food product 104, and these class labels may be stored as the food data 128. A binary "safe or not safe" and/or "fresh or not fresh/spoiled" classification of a food product 104 may be based on whether various criteria are met (e.g., whether thresholds are satisfied). "Satisfying" a threshold, as used herein can mean meeting or exceeding the threshold, or strictly exceeding the threshold. In an example, a safety standard may be met if a level of a pathogen(s) (e.g., the log CFU/g of the pathogen) in the food product 104 fails to satisfy a threshold. As another example, a freshness standard may be met if the food product 104 matches a certain color, or if the food product 104 is associated with a certain smell (e.g., a fresh smell) inferred from a gas(es) emanating from the food product 104.

In some examples, data 118 (e.g., image data) received from the gateway device(s) 110 and/or the user device 134 may be processed to determine a type of the food product 104 and/or a characteristic of the food product 104. For example, an image(s) of the food product 104 may be analyzed (e.g., using a trained machine learning model, as described above) to determine the type of food product 104 as part of a classification task for classifying the image data in one of multiple classes, such as a meat product, a vegetable product, a fruit product, a dairy product, etc. In some examples, the classification may be more granular, such as to classify the food product 104 as a tomato, a carrot, a cucumber, or any suitable level of granularity for the type of food product 104 based at least in part on the image data. In some examples, a data fusion approach to food type classification may be used for a more granular classification (e.g., classifying a food product as a cucumber verses a zucchini based on both image data and gas data, where gas data may be used primarily to distinguish between similar-looking food products on the basis of odor (or smell)). In some examples, the characteristic(s) of the food product 104 may include characteristics such as whether a container (e.g., a jar) containing the food product 104 is opened or closed, whether the food product 104 is frozen, thawed, cooked, partially consumed, etc. Because the type of the food product 104 and the characteristic of the food product 104 may be indicative of the expiration date of the food product, the safety metric and/or the freshness metric may be determined based at least in part on the type of the food product 104 and/or the characteristic of the food product 104. Consider, for example, a container of chicken broth stored in the storage receptacle 106. If the image data received from the gateway device indicates that the container has been opened, the safety metric may be different than a safety metric determined for the same type of food product 104 in an unopened container (e.g., a container with the seal still intact/unbroken). In some examples, data 118 (e.g., image data) received from the gateway device 110(1) and/or the user device 134 may be processed to determine that a food product 104 is a prepared meal comprised of multiple individual ingredients and/or food products 104 that are collocated in a container or on a plate. In these examples, data associated with each of the ingredients and/or individual food products 104 that make up the prepared meal may be obtained and analyzed to determine safety sub-metrics and/or freshness sub-metrics, and the edibility module(s) 124 may assign scores (or weights) to each sub-metric, which are used (e.g., combined, summed, averaged, etc.) to determine an overall safety metric and/or freshness metric associated with the prepared meal. For example, a prepared meal in the storage receptacle may be a plate of cooked chicken, with a side salad and a side of French fries. In this example, a first safety sub-metric may be determined for the cooked chicken, a second safety sub-metric may be determined for the side salad, and a third safety sub-metric may be determined for side of French fries, and these sub-metrics may be used to determine an overall safety metric for the prepared meal in the storage receptacle 106.

In some examples, the safety metric determined by the edibility module(s) 124 represents, or includes, an expiration date of the food product 104. That is, upon processing the data 118, the edibility module(s) 124 may be configured to determine a time remaining until the food product 104 is no longer safe to ingest. The expiration date may be determined at any suitable level of granularity, such as a day/date, a day/date and time of day, a time range (e.g., between Noon and 6:00 PM on Sunday, MM/DD/YYYY), or the like.

In some examples, user data 132 is obtained from the user 108 and is accessible to the computing system 102. At least some of the user data 132 can be used to determine the safety metric and/or the freshness metric for a particular user 108. In other words, the safety metric and/or the freshness metric may be a user-specific metric, a personalized metric, or a customized metric. For example, the user 108 may indicate (e.g., by providing user input to an application downloaded to the user device 134) whether they are pregnant, their age, whether they have any food allergies or other medical conditions that may be affected by the ingestion of certain foods, etc.). This user data 132 may be used to generate a risk profile for a particular user 108, and the risk profile of the user 108 may influence the safety of ingesting certain food products 104 for the particular user 108. For example, if the risk profile of the user 108 indicates that the user 108 is pregnant, a safety metric associated with sushi or deli meat stored in the storage receptacle 106 may indicate that the food product 104 is not safe to ingest for the particular user 108. This is an example of a user-specific safety metric, and, as such, a safety metric associated with the same food product 104, but determined for a different user (e.g., a user who is not pregnant), may be different (e.g., the sushi or deli meat may be classified as safe to ingest for a user who is not pregnant, assuming such food product 104 is not otherwise past its expiration date or otherwise spoiled).

Over time, it can be appreciated that a large amount of food data 128 can be collected and/or generated (e.g., by the devices 114, by the edibility module(s) 124, etc.) as food products 104 are placed in the storage receptacle 106 and as those food products 104 remain in the storage receptacle 106. This food data 128 is thereafter accessible to the computing system 102 and to the user 108 associated with the storage receptacle 106. The user 108 may access the food data 128 associated with the food products 104 that are stored in their storage receptacle 106 and/or receive information 116 associated therewith using the user device 134. For examples, the user device 134 may be configured to send data to, and receive data from, the computing system 102 over the network(s) 112. In some examples, the user 108 may log in to an account in order to access their food data 128. In some examples, the user 108 may access the food data 128 and/or the information 116 associated therewith via a browser, an application downloaded to the user device 134, or any other suitable software executing on the user device 134. The user device 134 can be implemented as any type and/or any number of computing devices, including a PC, a laptop computer, a desktop computer, a PDA, a mobile phone, tablet computer, a set-top box, a game console, a server computer, a wearable computer (e.g., a smart watch, headset, etc.), a smart speaker, or any other electronic device that can transmit data to, and receive data from, other devices. In the example of FIG. 1, the user device 134 is shown as receiving information 116 from the computing system 102. The information 116 may be received and/or displayed by the user device 134 in any suitable digital format, such as an electronic file (e.g., a portable document format (PDF) file), via a web browser, a client application, etc. The user 108 may also be able to print physical (e.g., paper) copies of the information 116. In some examples, the information 116 is displayed in an interactive format (e.g., the user 108 can interact with elements of the information 116 to reveal or hide information, to load curves, generate charts, graphs, to access more information (e.g., details regarding food preparation recommendations), receive information about other food products 104 in the storage receptacle 106, or the like). It is to be appreciated that the information 116 received and displayed at a user device 134 may be unalterable (e.g., the user 108 may be unable to change or manipulate the information 116 so that the information 116 cannot be falsified). In this manner, the information 116 may serve as a reliable source of information (e.g., as evidence) that can be used to demonstrate compliance with standards, rules and/or regulations of a food safety regulating body, such as food safety (e.g., restaurant) inspectors.

FIG. 1 depicts an example user interface 136 that may be displayed on the user device 134. The information 116 displayed via the user interface 136 may represent information 116 that is output (e.g., displayed) based on the safety metric and/or the freshness metric determined by the edibility module(s) 124. In some examples, the user interface 136 is displayed at the request of the user 108 to view the information 116 via the user device 134. In the example of FIG. 1, the information 116 displayed via the user interface 136 may include information about a food product 104 stored in the storage receptacle 106, such as an identifier of the food product 104 (e.g., "Food Product: ABC"), as well as information 116 that indicates whether the food product 104 is safe to ingest, such as by displaying a class label indicative of a safety of the food product 104 (e.g., a Safe to Ingest? "Yes" or "No" classification), which is based on the safety metric indicative of the probability of the food product 104 being safe to ingest. In some examples, an information element 135 is presented in association with the safety information about the food product 104. The information element 135 may be interactive such that the user 108 can interact with (e.g., select) the information element 135 to learn more information about the safety of the food product 104. For example, upon selecting the information element 135, additional safety information may pop-up on the user interface 136 indicating how the safety metric was calculated, more specific safety risks associated with the food product 104, why the food product 104 was deemed safe or unsafe, tips or recommendations for keeping the food product 104 safe for a maximum period of time (e.g., recommended storage temperature, recommended storage container, etc.), or the like.

The information 116 may further indicate whether the food product 104 is fresh, such as by displaying a freshness meter or scale that ranges from "not fresh" to "fresh," along with a marker that indicates where the food product 104 resides on the freshness meter or scale, which is based on the freshness metric indicative of the freshness of the food product 104. In some examples, an information element 137 is presented in association with the freshness information about the food product 104. The information element 137 may be interactive such that the user 108 can interact with (e.g., select) the information element 137 to learn more information about the freshness of the food product 104. For example, upon selecting the information element 137, additional freshness information may pop-up on the user interface 136 indicating how the freshness metric was calculated, more specific freshness characteristics (e.g., crisp, good coloration, etc.) associated with the food product 104, why the food product 104 was deemed fresh or not fresh, tips or recommendations for keeping the food product 104 fresh for a maximum period of time (e.g., recommended storage temperature, recommended storage container, etc.), or the like.

In some examples, the information 116 further indicates an expiration date of the food product 104 or a time remaining until the expiration date, as determined by the edibility module(s) 124 based at least in part on the data 118 associated with the stored food product 104. In some examples, the information 116 indicates a use by date (or an expiration date) that is printed on a label (or the packaging) of the food product 104. For example, the user 108 may scan or otherwise take a picture of a label (or a code printed thereon) on the food product 104, and the data generated from the scanned or captured label may be processed to extract the use by date (or expiration date) determined by the manufacturer/distributer of the food product 104, and this extracted use by date (or expiration date) can be included in the information 116 for presentation via the user interface 136. In some examples, this use by date (or expiration date) on the label of the food product 104 is presented next to the use by date (or expiration date) of the food product 104 determined (e.g., predicted) by the edibility module(s) 124 within a section 139 of the user interface 136, as shown in FIG. 1. In this way, the user 108 can easily compare the use by date (or expiration date) on the label with the predicted use by date (or expiration date) to determine whether the use by date (or expiration date) on the label of the food product 104 is accurate. In the example of FIG. 1, the information 116 output via the user device 134 within the section 139 indicates that a consumer (e.g., the user 108) has an extra three days beyond the use by date (or expiration date) printed on the label of the food product 104 to eat the food product 104 before it expires. The information 116 presented within the section 139 of the user interface 136 can, therefore, reduce waste by providing the user 108 with knowledge regarding the accuracy of the use by date (or expiration date) printed on the label of the food product 104 so that the user 108 does not discard the food product 104 earlier than necessary. The user interface 136 may further include interactive elements 138, 140, and/or 142 that can be interacted with by the user 108. For example, a "recipes/menus" element 138 (e.g., button) may represent a food preparation recommendation and may be selected by the user 108 to access more information about a recipe for a meal using the food product 104 and/or a menu of one or more meals incorporating the food product 104. The food data 128, for example, may store a plurality of recipes and/or meal options with indexes to food products that are used in those recipes and/or meal options for quick look-up in a database, and/or the computing system 102 may be configured to search the Internet using a search engine for recipes and/or meal options that use the food product 104. For example, if the food product 104 is tuna fish, the user 108 may select the "recipes/menus" element 138 to access more information about a tuna casserole recipe, and/or the user 108 may be provided with a suggested meal plan where tuna is used in one or more meals, such as a first meal including a tuna sandwich for Monday, a second meal including a tuna salad for Wednesday, and so on and so forth. The "suggested shopping list" element 140 (e.g., button) may represent a food preparation recommendation and may be selected by the user 108 to access more information about one or more other food products and/or food ingredients to acquire (e.g., to purchase at a grocery store) for use with the food product 104. In the running example, if the user 108 is out of mayonnaise, and if the food product is tuna fish, the suggested shopping list may include a jar of mayonnaise, which can be purchased online or in person from a grocery store and used with the tuna fish to make a tuna fish sandwich. The "other food in fridge" element 142 (e.g., button) may be selected by the user 108 to access information 116 about other food products 104 stored in the storage receptacle 106. For example, if "Food Product: ABC" represents a jar of jelly, the user 108 may select the "other food in fridge" element 142 to view information 116 about the safety and/or freshness of a carton of milk stored in the storage receptacle 106.

Although FIG. 1 depicts the user device 134 as being a mobile phone, it is to be appreciated that the user device 134 can represent other types of devices, as mentioned above, and that the information 116 can be output via any one or more of those other types of devices in addition to, or as an alternative, to outputting the information 116 via a mobile phone of the user 108. For example, the storage receptacle 106 may include a display, and the information 116 may be output via the display on the storage receptacle 106 (e.g., a refrigerator display). As another example, the information 116 can be output via a smart speaker or a connected speaker. Accordingly, the information 116 can be output as visual information, audible information (e.g., synthetic speech output via a speaker(s)), and/or a combination thereof.

In some examples, the information 116 output via the user device 134 may include a warning, an alert, or another suitable type of notification for the user 108, which attempts to alert the user 108 about the information 116. For example, the information 116 may be displayed on the user device 134 along with an audible chime to notify the user 108 about the information 116. This is especially useful in the case where a safety metric determined for a particular food product 104 indicates that the food product 104 is, or is likely to be, unsafe to ingest (e.g., because the food product 104 is likely spoiled). In some examples, one or more devices (e.g., sensors) may detect the presence of the user 108 in a kitchen where the storage receptacle 106 is located, and a warning, alert, or another suitable type of notification may be output via the user device 134 upon detecting the presence of the user 108 in the kitchen. In this manner, the user 108 may be provided with a timely warning about the safety of a food product 104 stored in the storage receptacle 106. The presence of the user 108 may be detected via any suitable device (e.g., sensor), such as a camera in, on, or near the storage receptacle 106, a smart speaker detecting speech in an area where the storage receptacle 106 is located, a location tracking mechanism (e.g., a Global Positioning System (GPS) receiver) of the user device 134 determining that the user device 134 (e.g., a mobile phone) is within a threshold distance of the storage receptacle 106, or the like. In an illustrative example, a device may detect the presence of the user 108 in a kitchen where the storage receptacle 106 is located, and the user device 134 may output an audible and/or visual warning that says "Warning: Do not drink the milk in the refrigerator. It may be spoiled."

In some examples, one or more devices 114 associated with the storage receptacle 106 may be configured to detect when a food product 104 has been placed in the storage receptacle 106 and/or when a food product 104 has been removed from the storage receptacle 106. These events may be detectable by a camera(s) in the storage receptacle 106, for example. In another example, a scanner in or on the storage receptacle 106 may allow the user 108 to scan a barcode or another suitable machine-readable code as the user 108 places a food product 104 in the storage receptacle 106 and/or removes a food product 104 from the storage receptacle 106, similar to a keyed entry and/or exit system. In these examples, the data 118 received via the gateway device 110(1) may include a timestamp corresponding to a time of entry and/or exit of a food product 104 into/from the storage receptacle 106 so that these events can be recorded in the food data 128. Tracking such events may allow for prompting the user 108 to capture images of a food product 104 that has been removed from the storage receptacle 106, as described above, and/or for taking into account an amount of time the food product 104 has been outside of the storage receptacle 106 in determining the safety metric and/or the freshness metric for the food product 104. In some examples, an alert may be output via the user device 134 after a period of time has lapsed since a food product 104 was removed from the storage receptacle 106. Such an alert may alert the user 108 that a food product 104 has been outside the storage receptacle 106 for more than a threshold time period, and a recommendation to return the food product 104 to the storage receptacle 106 may be provided to the user 108 via the user device 134 in order to mitigate instances of the user 108 forgetting to put a food product 104 back in the storage receptacle 106.

In some examples, the edibility module(s) 124 may be configured to analyze safety metrics and/or freshness metrics determine over a period of time for one or more of the food products 104 stored in the storage receptacle 106, which may allow for determining trends, patterns, and the like. If, for example, food products 104 in the user's 108 storage receptacle 106 are determined to be unsafe to ingest and/or not fresh at a higher rate than average for a user population, the edibility module(s) 124 may cause the user device 134 to output a notification of this above-average rate so that the user 108 can take remedial action (e.g., by lowering the temperature of the storage receptacle 106), and/or the computing system 102 may remotely control the storage receptacle 106 to adjust its temperature to better preserve the food products 104 stored therein and/or prolong their lifespan before expiration.

Using the platform 100 described herein, a user 108 who is viewing the information 116 output via the user device 134 is able to make an informed decision as to whether and when to ingest (e.g., consume) a particular food product 104 stored in the storage receptacle 106, or to otherwise discard the food product 104 if the information 116 indicates that the food product 104 is not safe to ingest (and/or not fresh). That is, the disclosed platform 100 allows the user 108 to confirm that a food product 104 stored in the storage receptacle 106 is safe to ingest before the food product 104 is ingested by the user 108 or by another consumer(s). The techniques, devices, and systems described herein can improve existing technologies used in the food industry for notifying users regarding the expiration of food products and/or their potential spoilage (or even their lack of freshness) by providing users (e.g., the user 108) with more food safety information 116 (and potentially food freshness information). This information 116 is more up-to-date than a label printed on a food product package because the information is based on data 118 associated with the food product 104 that is received after the food product 104 is produced and sold for consumption, and because data 118 may be received on a continual basis over time, as the food product 104 remains stored in the storage receptacle 106. The disclosed techniques, devices, and systems also allow for providing food safety information 116 (and potentially food freshness information) in a more conspicuous manner to an end user 108 and in a manner that is more readily available to an end user 108, as compared to a printed label on the packaging of the food product. For example, the user 108 can view food safety information 116 about a food product 104 on the user device 134 (e.g., a handheld smart phone) without opening the storage receptacle 106 to look at a label printed on the food product's packaging and without having to visually inspect or smell the food product 104. Due to these and other advantages of the disclosed technology, instances of food poisoning or other food-borne illnesses can be reduced or mitigated across the general population.

In some cases, the platform 100 may detect food products 104 that have spoiled quicker than anticipated by a manufacturer or vendor of the food product 104, and, as such, the information 116 output via the user device 134 can inform the user 108 regarding a shortened lifespan of the food product 104 determined by the platform 100, which allows the user 108 to better plan for the consumption of the food product 104 before it expires. Moreover, the food preparation recommendation(s) (e.g., elements 138 and/or 140 in FIG. 1) may incentivize the user 108 to use a food product 104 before it expires.

As mentioned, the techniques, devices, and systems described herein reduce food waste by informing the user 108 about the safety (and potentially the freshness) of a food product 104 stored in the storage receptacle 106 in a readily accessible, conspicuous way. Accordingly, food waste can be reduced by increasing the likelihood of food being consumed, and by reducing the likelihood of food being discarded, before it expires. Reduction of food waste, in turn, conserves resources, such as power resources (e.g., energy), processing resources, memory resources, networking resources, and the like, which would otherwise be used to dispose of food waste. For example, less food waste means fewer garbage trucks collecting food waste, and/or less frequent garbage pickups, and/or a reduced amount of food waste being disposed in a landfill, for example The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
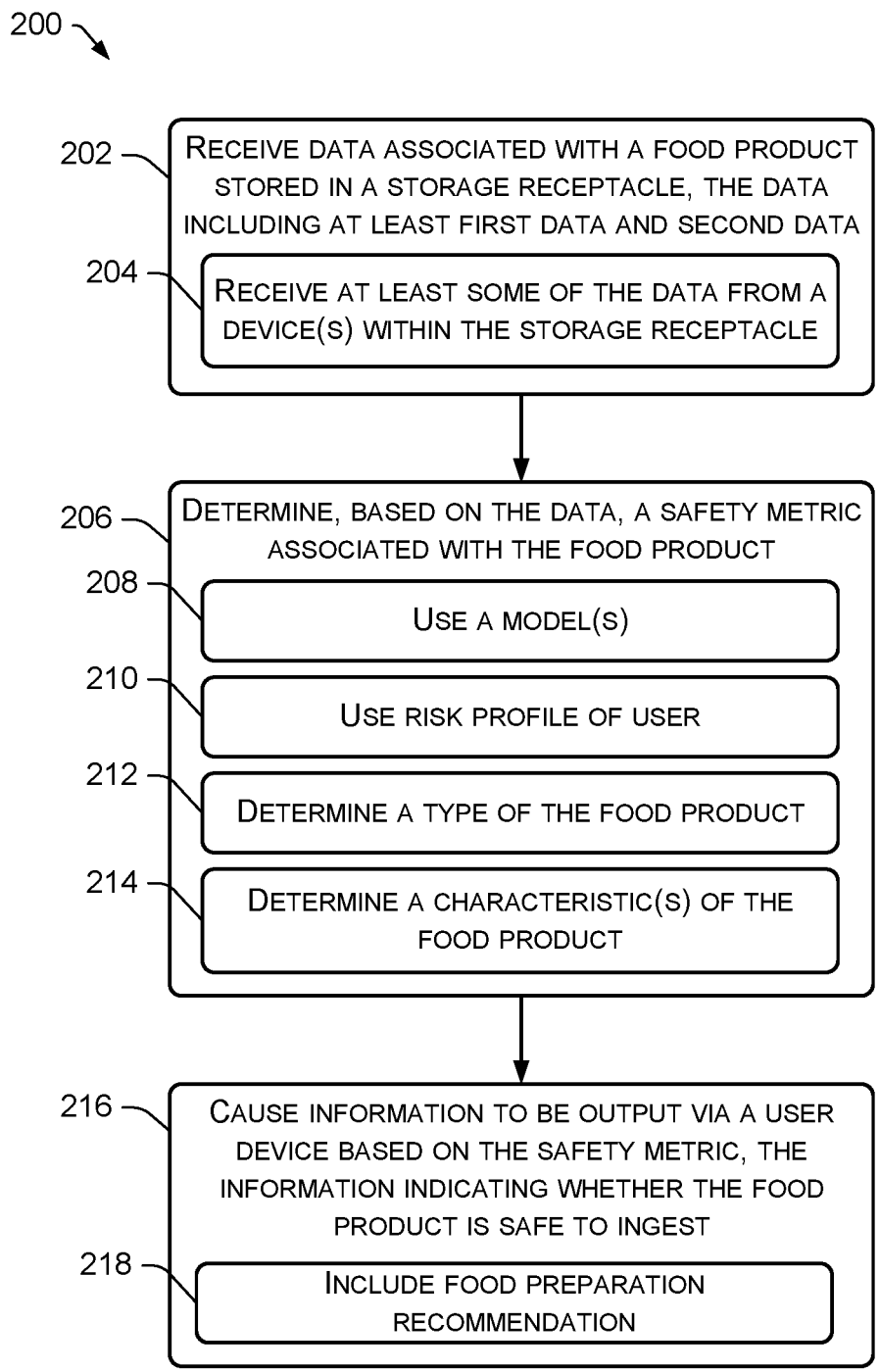
FIG. 2 is a flow diagram of an example process for determining whether an ingestible product stored in a storage receptacle is safe to ingest.

FIG. 2 is a flow diagram of an example process 200 for determining whether an ingestible product 104 (e.g., a food product 104) stored in a storage receptacle 106 is safe to ingest. The process 200 is described, by way of example, with reference to the previous figures. In some examples, the process 200 may be implemented by the computing system 102 described herein.

At 202, a computing system 102 may receive data 118 associated with a food product 104 stored in a storage receptacle 106. In some examples, the data 118 received at block 202 is received from at least two different data sources. For example, the computing system 102 may receive first data 118(1) from a first data source and second data 118(2) from a second data source, and possibly additional data 118 from one or more additional data sources. As indicated by block 204, at least some of the data 118 received at block 202 is received from a device 114 within the storage receptacle 106. Said another way, at least one of the sources of the data 118 received at block 202 may be a device(s) 114 (e.g., a sensor(s)) within the storage receptacle 106. To illustrate, a device 114 within the storage receptacle 106 may include a camera(s), and first data 118(1) received at block 202 may include image data representing one or more images of the food product 104 stored in the storage receptacle 106. In this example, second data 118(2) received at block 202 may be from a different data source, such as another device(s) 114 (e.g., sensor(s)) within the storage receptacle 106. For example, second data 118(2) received at block 202 may be gas data indicating an odor of the food product 104 stored in the storage receptacle 106, the gas data received from a gas sensor(s) within the storage receptacle 106. As another example, second data 118(2) received at block 202 may be temperature data indicating a temperature of the food product 104 stored in the storage receptacle 106, the temperature data received from a temperature sensor(s) within the storage receptacle 106. In another example, the data 118 received at block 202 may not include image data. For example, a device 114 within the storage receptacle 106 may include a gas sensor(s), and first data 118(1) received at block 202 may include gas data indicating an odor of the food product 104 stored in the storage receptacle 106, while second data 118(2) received at block 202 may be temperature data indicating a temperature of the food product 104 stored in the storage receptacle 106, the temperature data received from a temperature sensor(s) within the storage receptacle 106. In yet another example, data 118 received at block 202 may include data from a user device 134 (e.g., image data of the food product 104 captured using a camera of the user device 134). In yet another example, data 118 received at block 202 may include data from a device within a facility 119 where the food product 104 was processed or produced (e.g., food production data 118(3) associated with a food production process that was carried out to produce the food product 104). In any of these examples, the computing system 102 receives first data 118(1) from a first data source and second data 118(2) from a second data source, and possibly additional data 118 from one or more additional data sources. The storage receptacle 106 where the food product 104 is stored may be temperature-controlled, in some examples. For example, the storage receptacle 106 may be a refrigerator, a freezer, or the like. In some examples, the data 118 may be received at block 202 via/from a gateway device(s) 110, such as a gateway device 110(1) located near the storage receptacle 106 where the food product 104 is being stored, and/or a gateway device 110(2) located near a facility 119 where the food product 104 was processed, as described herein.

At 206, the computing system 102 (e.g., using the edibility module(s) 124) may determine, based at least in part on first data 118(1), second data 118(2), etc. received at block 202, a metric associated with the food product 104. This metric may be a safety metric indicative of a probability of the food product 104 being safe to ingest. As indicated by block 208, the safety metric can be determined at block 206 using one or more models 126. For example, the safety metric may be determined at block 206 using a data fusion model that integrates or combines the data 118 received from the multiple data sources at block 202. At least one example of such a data fusion model is a model of weights that assigns (i) a first weight to the first data 118(1), the first weight indicative of a reliability of the first data 118(1), (ii) a second weight to the second data 118(2), the second weight indicative of a reliability of the second data 118(2), and so on, and then computes the safety metric based at least in part on the first weight, the second weight, and so on, as described above (e.g., by computing a weighted average). In some examples, a trained machine learning model(s) can be used as a data fusion model by receiving multiple different types of data 118 as input and outputting the safety metric associated with the food product 104. For example, the edibility module(s) 124 may provide the first data 118(1), the second data 118(2), and so on as input to a trained machine learning model(s) to determine the safety metric, and/or the first data 118(1) may be provided as input to a first trained machine learning model(s), second data 118(2) may be provided as input to a second trained machine learning model(s), and so on, and the outputs of the respective models can be combined to determine an overall safety metric. In some examples, the model 126 used at block 208 is a mathematical model, such as a pathogen growth model that models growth of a pathogen in the food product 104 as a function of temperature, as described herein.

As indicated by block 210, the safety metric can be determined at block 206 based at least in part on a risk profile of a user 108. For example, user data 132 can be obtained from a user 108 associated with the storage receptacle 106, and the user data 132 can be thereafter accessible to the computing system 102. At least some of the user data 132 can be used, at block 210, to determine the safety metric for a particular user 108. In other words, the safety metric may be a user-specific metric, a personalized metric, or a customized metric. For example, the user 108 may indicate (e.g., by providing user input to an application downloaded to the user device 134) whether they are pregnant, their age, whether they have any food allergies or other medical conditions that may be affected by the ingestion of certain foods, etc.). This user data 132 may be used to generate a risk profile for the user 108, and the risk profile of the user 108 may influence the safety of ingesting certain food products 104 for the particular user 108.

As indicated by block 212, the computing system 102 may determine a type of the food product 104 based on the data 118 received at block 202. For example, image data representing one or more images of the food product 104 may be received at block 202 and analyzed, as described herein, to determine the type of food product 104 (e.g., in categories of meat, vegetables, fruit, dairy, or categories that are more or less granular). In this example, the safety metric can be determined at block 206 based at least in part on the type of the food product 104. For example, different types of food products 104 may be more or less perishable than others, and, as such, the safety metric may account for the type of food product 104. This may be factored into the determination of the safety metric by using a model(s) 126 that is specific to the type of the food product 104, and/or safety metric for certain types of food products 104 may depend on the risk profile of the user 108 (e.g., raw meat products may be categorically determined to be unsafe for users who are pregnant and/or nursing).

As indicated by block 214, the computing system 102 may determine one or more characteristics of the food product 104 based on the data 118 received at block 202. The characteristic(s) of the food product 104 determined at block 214 may include characteristics such as whether a container (e.g., a jar) containing the food product 104 is opened or closed, whether the food product 104 is frozen, thawed, cooked, partially consumed, etc. Such characteristics may be determined from image data, temperature data, and/or gas data, as described herein. In this example, the safety metric can be determined at block 206 based at least in part on the characteristic(s) of the food product 104. For example, a food product 104 with a first characteristic (e.g., container opened) may be more perishable than the same food product 104 with a second, different characteristic (e.g., container closed/sealed), and, as such, the safety metric may account for the characteristic(s) of the food product 104. This may be factored into the determination of the safety metric by using a model(s) 126 that is specific to particular characteristics of food products 104.

At 216, the computing system 102 (e.g., the edibility module(s) 124) may cause information 116 to be output via a user device 134 (e.g., by presenting the information 116 in a user interface 136) based at least in part on the safety metric determined at block 206. The information 116 output at block 216 may indicate whether the food product 104 is safe to ingest. For example, a binary classification of Safe to Ingest? "Yes" or "No," may be output (e.g., displayed) via the user device 134, as depicted in the user interface 136 of FIG. 1. As indicated by block 218, in some examples, the information 116 may further indicate a food preparation recommendation(s) that uses the food product 104. Examples of food preparation recommendation(s) are shown in the user interface 136 of FIG. 1 via the elements 138 and 140. For example, the food preparation recommendation(s) may include a recipe(s) for a meal using the food product 104, a menu of one or more meals incorporating the food product 104, and/or a suggested shopping list that includes a second food product(s) and/or a food ingredient(s) to acquire for use with the food product 104, as described herein. The food preparation recommendation(s) may incentivize the user 108 to use the food product 104 before it expires to minimize food waste.

To illustrate example implementations of the process 200, example scenarios will be described. In a first example scenario, a user 108 may open a jar of jelly, use some of the jelly, and place the jar of jelly in their refrigerator (an example of a storage receptacle 106). The refrigerator may be equipped with a camera configured to captures images of the jar of jelly, as well as a temperature sensor configured to detect a temperature of the jelly. Data 118 from the camera and the temperature sensor may be received at block 202 of the process 200. At block 206, a safety metric associated with the jar of jelly may be determined based on the data 118 received at block 202. For example, first data 118(1) received at block 202 may be image data exhibiting that the jar of jelly has been opened (e.g., a seal has been broken) and/or that the jar is not full, indicating that the jelly has been partially consumed. The image data may further show the color of the jelly, which may be indicative of freshness and/or spoilage. Second data 118(2) received at block 202 may be temperature data indicating a temperature of the jar of jelly. Over a period of time, the temperature may transition from a temperature close to room temperature to a temperature of the refrigerator, indicating that the jelly was out of the refrigerator long enough to reach room temperature. A model(s) 126 may be utilized at block 208, and/or a risk profile of the user 108 may be utilized at block 210, the type of food product 104 may be determined at block 212, and/or a characteristic(s) of the food product 104 may be determined at block 214, any or all of which may be used to determine the safety metric of the jar of jelly, as described herein. At block 216, information 116 may be output via a user device 134 based on the safety metric, which may indicate to the user 108 that the jelly is safe to ingest, or unsafe to ingest, as the case may be. The information 116 may further include a food preparation recommendation(s), such as a recipe that uses jelly, or a suggested shopping list of peanut butter and bread, dinner rolls, or the like.

In another example scenario, a user 108 may take a frozen fillet of fish out of their freezer and place the frozen fish in their refrigerator (an example of a storage receptacle 106). The refrigerator may be equipped with a temperature sensor configured to detect a temperature of the fish, as well as a gas sensor configured to detect a concentration of gas(es) emanating from the fish. Data 118 from the temperature sensor and the gas sensor may be received at block 202 of the process 200. At block 206, a safety metric associated with the fish may be determined based on the data 118 received at block 202. For example, first data 118(1) received at block 202 may be temperature data indicating that the fish is well below the temperature inside the refrigerator indicating that the fish is still frozen. As the fillet of fish thaws, the temperature may rise, as detected by the temperature sensor and exhibited in the temperature data, indicating that the fillet of fish is thawing or has thawed. Second data 118(2) received at block 202 may be gas data indicating an odor of the fish. For example, a trained machine learning model(s) 126 may be utilized at block 208 to classify the gas data as one of multiple classes of odors (e.g., fresh or spoiled/rotten). In some examples, a risk profile of the user 108 may be utilized at block 210 to determine a user-specific safety metric associated with the fish for the user 108, the type of food product 104 may be determined at block 212, and/or a characteristic(s) of the food product 104 may be determined at block 214, any or all of which may be used to determine the safety metric of the fish, as described herein. At block 216, information 116 may be output via a user device 134 based on the safety metric, which may indicate to the user 108 that the fish is safe to ingest, or unsafe to ingest, as the case may be. The information 116 may further include a food preparation recommendation(s), such as a recipe that uses fish, or a suggested shopping list of tartar sauce, or the like.

In yet another example scenario, a user 108 may cook macaroni and cheese and place the leftover macaroni and cheese in their refrigerator (an example of a storage receptacle 106). The refrigerator may be equipped with a camera configured to capture images of the macaroni and cheese, as well as a gas sensor configured to detect a concentration of gas(es) emanating from the macaroni and cheese. Data 118 from the camera and the gas sensor may be received at block 202 of the process 200. At block 206, a safety metric associated with the macaroni and cheese may be determined based on the data 118 received at block 202. For example, first data 118(1) received at block 202 may be image data indicating a color of the macaroni and cheese, whether the macaroni and cheese is in a sealed container, or the like. Second data 118(2) received at block 202 may be gas data indicating an odor of the macaroni and cheese. For example, a trained machine learning model(s) 126 may be utilized at block 208 to classify the gas data as one of multiple classes of odors (e.g., fresh or spoiled). In some examples, a risk profile of the user 108 may be utilized at block 210, the type of food product 104 may be determined at block 212, and/or a characteristic(s) of the food product 104 may be determined at block 214, any or all of which may be used to determine the safety metric of the macaroni and cheese, as described herein. At block 216, information 116 may be output via a user device 134 based on the safety metric, which may indicate to the user 108 that the macaroni and cheese is safe to ingest, or unsafe to ingest, as the case may be. The information 116 may further include a food preparation recommendation(s), such as a recipe that uses macaroni and cheese, or a suggested shopping list of tartar sauce, or the like.

Figure 3:
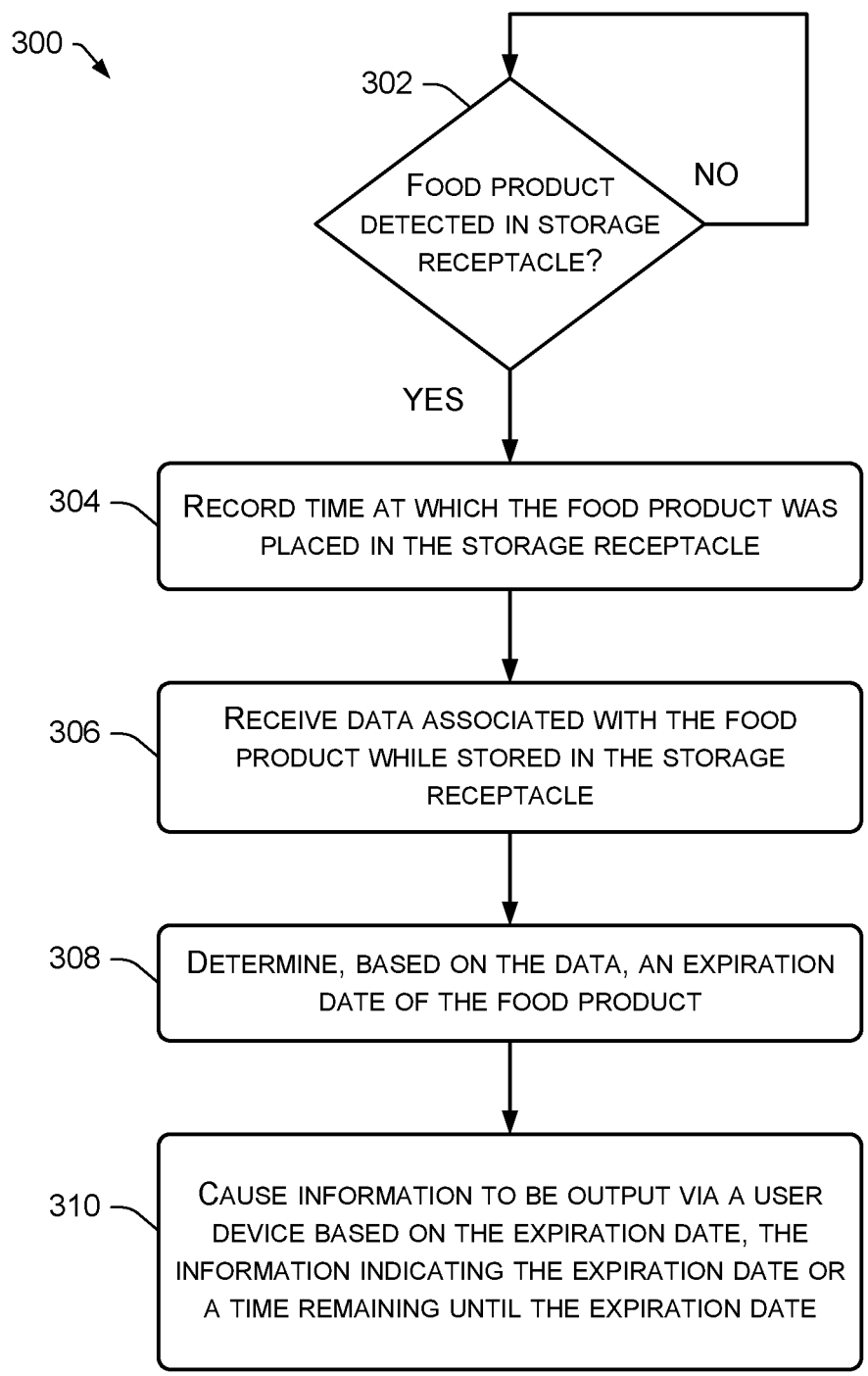
FIG. 3 is a flow diagram of another example process for determining whether an ingestible product stored in a storage receptacle is safe to ingest.

FIG. 3 is a flow diagram of another example process 300 for determining whether an ingestible product 104 (e.g., a food product 104) stored in a storage receptacle 106 is safe to ingest. The process 300 is described, by way of example, with reference to the previous figures. In some examples, the process 300 may be implemented by the computing system 102 described herein.

At 302, a computing system 102 may determine whether a food product 104 has been placed in a storage receptacle 106. For example, one or more devices 114 associated with the storage receptacle 106 may be configured to detect when a food product 104 has been placed in the storage receptacle 106 and/or when a food product 104 has been removed from the storage receptacle 106. These events may be detectable by a camera(s) in the storage receptacle 106, for example. In another example, a scanner in or on the storage receptacle 106 may allow the user 108 to scan a barcode or another suitable machine-readable code as the user 108 places a food product 104 in the storage receptacle 106 and/or removes a food product 104 from the storage receptacle 106, similar to a keyed entry and/or exit system. If no food product 104 has been placed in the storage receptacle 106, the process 300 may follow the NO route from block 302 to continue monitoring for a food product 104 being placed in the storage receptacle. As soon as a food product is determined to have been placed in the storage receptacle 106, the process 300 may follow the YES route from block 302 to block 304.

At 304, the computing system 102 may record a time at which the food product 104 was placed in the storage receptacle 106. For example, data 118 received via the gateway device 110(1) may include a timestamp corresponding to a time of entry of a food product 104 into the storage receptacle 106, and the computing system 102 may record the time in the food data 128.

At 306, the computing system 102 may receive data 118 associated with the food product 104 while the food product 104 is stored in the storage receptacle 106. In some examples, the data 118 received at block 306 may be from at least two different data sources, as described herein. The operation(s) performed at block 306 may be similar to those performed at block 202 of the process 200 and described above.

At 308, the computing system 102 (e.g., using the edibility module(s) 124) may determine, based at least in part on the data 118 received at block 306, an expiration date of the food product 104. This expiration data may be determined as a safety metric indicative of a probability of the food product 104 being safe to ingest. Accordingly, the operation(s) performed at block 308 may be similar to those performed at block 206 of the process 200 and described above.

At 310, the computing system 102 (e.g., the edibility module(s) 124) may cause information 116 to be output via a user device 134 (e.g., by presenting the information 116 in a user interface 136) based at least in part on the expiration date determined at block 308. The information 116 output at block 310 may indicate the expiration date or a time remaining until the expiration date. An example of this is shown in the user interface 136 of FIG. 1. The operation(s) performed at block 310 may be similar to those performed at block 216 of the process 200 and described above.

Detecting the placement of the food product 104 in the storage receptacle 106 in the process 300 may result in resource conservation, such as refraining from using computing resources to determine an expiration date associated with the food product 104 until it is placed in the storage receptacle 106. That is, placement of the food product 104 in the storage receptacle 106 may be used as a trigger for executing the remainder of the process 300, which uses computing resources. Furthermore, tracking the time of entry and the expiration date of the food product 104 allows for providing information 116 to the user 108 at a more granular level of detail to reduce food waste.

Figure 4:
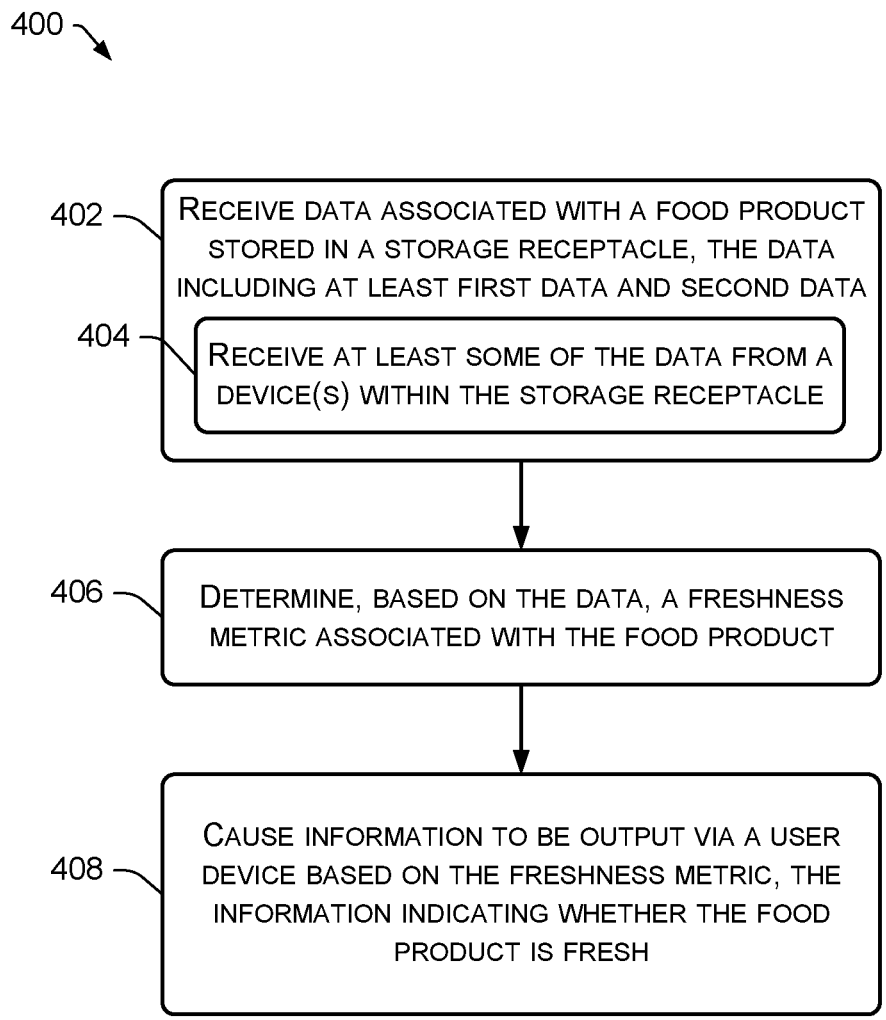
FIG. 4 is a flow diagram of an example process for determining whether an ingestible product stored in a storage receptacle is fresh.

FIG. 4 is a flow diagram of an example process 400 for determining whether an ingestible product 104 (e.g., a food product 104) stored in a storage receptacle 106 is fresh. The process 400 is described, by way of example, with reference to the previous figures. In some examples, the process 400 may be implemented by the computing system 102 described herein.

At 402, a computing system 102 may receive data 118 associated with a food product 104 stored in a storage receptacle 106. In some examples, the data 118 received at block 402 is received from at least two different data sources. For example, the computing system 102 may receive first data 118(1) from a first data source and second data 118(2) from a second data source, and possibly additional data 118 from one or more additional data sources. As indicated by block 404, at least some of the data 118 received at block 402 is received from a device 114 within the storage receptacle 106. The operation(s) performed at blocks 402 and 404 may be similar to those performed at blocks 202 and 204, respectively, of the process 200 and described above.

At 406, the computing system 102 (e.g., using the edibility module(s) 124) may determine, based at least in part on first data 118(1), second data 118(2), etc. received at block 402, a metric associated with the food product 104. This metric may be a freshness metric indicative of a freshness of the food product 104. Similar to the description above with respect to block 206 (and the sub-blocks thereof) of the process 200, the freshness metric can be determined at block 406 using one or more models 126, and/or based at least in part on a risk profile of a user 108, a type of the food product 104, and/or a characteristic(s) of the food product 104. Accordingly, the operation(s) performed at block 406 may be similar to those performed at blocks 206-214 of the process 200 and described above, except that the metric determined is a freshness metric indicative of a freshness of the food product 104.

At 408, the computing system 102 (e.g., the edibility module(s) 124) may cause information 116 to be output via a user device 134 (e.g., by presenting the information 116 in a user interface 136) based at least in part on the freshness metric determined at block 406. The information 116 output at block 408 may indicate whether the food product 104 is fresh. For example, a freshness meter or scale that ranges from "not fresh" to "fresh," along with a marker that indicates where the food product 104 resides on the freshness meter or scale may be output (e.g., displayed) via the user device 134, as depicted in the user interface 136 of FIG. 1. The operation(s) performed at block 408 may be similar to those performed at blocks 216-218 of the process 200 and described above.

Figure 5:
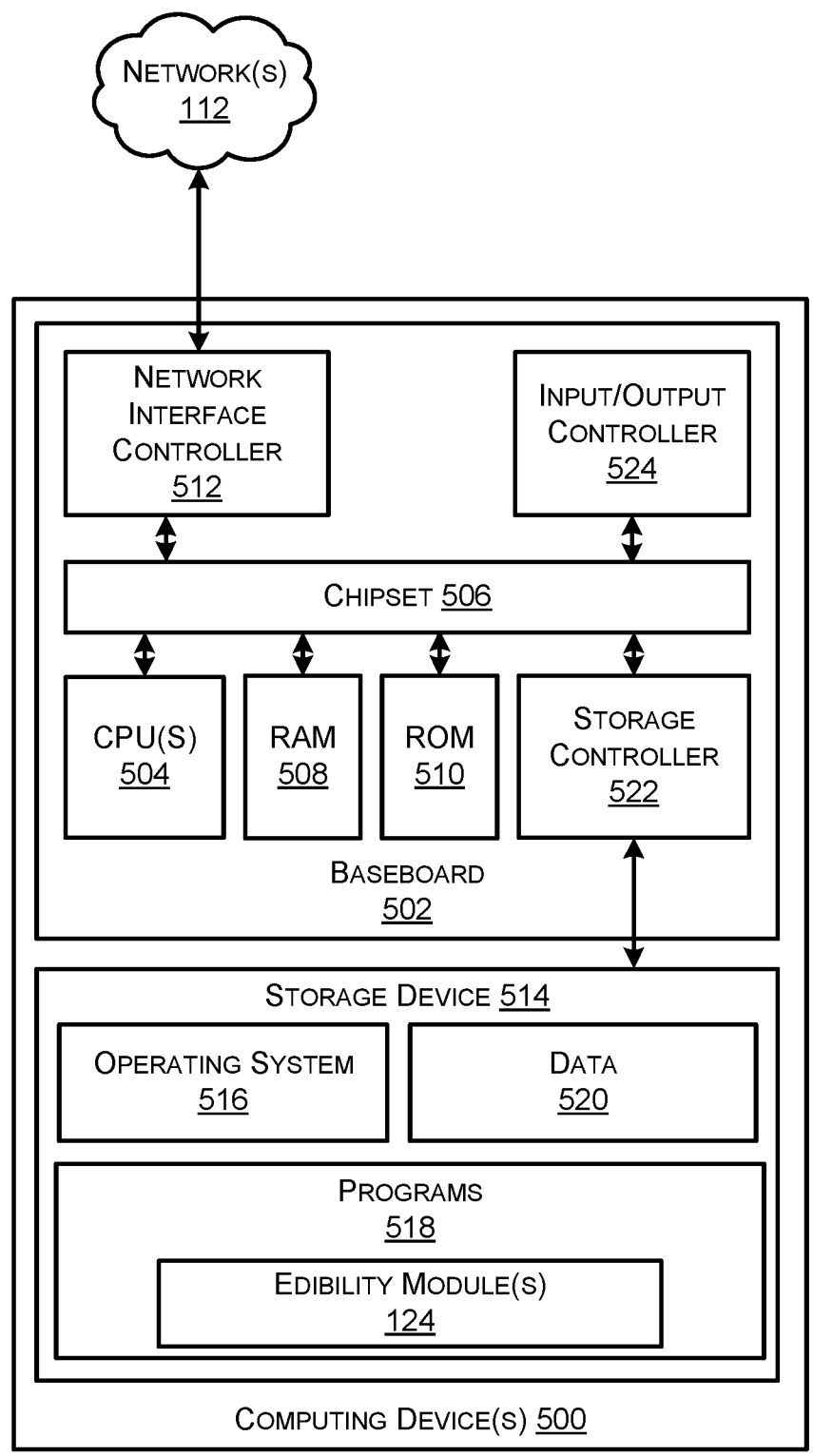
FIG. 5 is a computer architecture diagram showing an illustrative computer architecture for implementing a computing device(s) that can be utilized to implement aspects of the various technologies presented herein.

FIG. 5 shows an example computer architecture for a computing device(s) 500 capable of executing program components for implementing the functionality described above. The computer architecture shown in FIG. 5 may represent a workstation, desktop computer, laptop, tablet, network appliance, smartphone, server computer, or other computing device, and can be utilized to execute any of the software components presented herein. For example, the computing device(s) 500 may represent a server(s) of the computing system 102. As another example, the computing device(s) 500 may represent the gateway device(s) 110.

The computer 500 includes a baseboard 502, which is a printed circuit board (PCB) to which a multitude of components or devices can be connected by way of a system bus or other electrical communication paths. In one illustrative configuration, one or more CPUs 504 operate in conjunction with a chipset 506. The CPUs 504 can be standard programmable processors that perform arithmetic and logical operations necessary for the operation of the computer 500, and the CPUs 504 may be the same as, or similar to, the processor(s) 120 of FIG. 1.

The CPUs 504 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 may represent the "hardware bus" described above, and it can provide an interface to a RAM 508, used as the main memory in the computing device(s) 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computing device(s) 500 in accordance with the configurations described herein.

The computing device(s) 500 can operate in a networked environment using logical connections to remote computing devices and computer systems through a network, such as the network 112 of FIG. 1. The chipset 506 can include functionality for providing network connectivity through a network interface controller (NIC) 512, such as a gigabit Ethernet adapter. The NIC 512 may be capable of connecting the computing device(s) 500 to other computing devices over the network 112. It should be appreciated that multiple NICs 512 can be present in the computing device(s) 500, connecting the computer to other types of networks and remote computer systems.

The computing device(s) 500 can be connected to a mass storage device 514 that provides non-volatile storage for the computer. The mass storage device 514 can store an operating system 516, programs 518, and data 520, to carry out the techniques and operations described in greater detail herein. For example, the programs 518 may include the edibility module(s) 124 described herein, and the data 520 may include the model(s) 126, the food safety data 128, and/or the reports 132 described elsewhere herein. The mass storage device 514 can be connected to the computing device 500 through a storage controller 522 connected to the chipset 506. The mass storage device 514 can consist of one or more physical storage units. The storage controller 522 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device(s) 500 can store data on the mass storage device 514 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 514 is characterized as primary or secondary storage, and the like.

For example, the computing device(s) 500 can store information to the mass storage device 514 by issuing instructions through the storage controller 522 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device(s) 500 can further read information from the mass storage device 514 by detecting the physical states or characteristics of one or more particular locations within the physical storage units.

In addition to the mass storage device 514 described above, the computing device(s) 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device(s) 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

In one configuration, the mass storage device 514 or other computer-readable storage media is encoded with computer-executable instructions which, when loaded into the computing device(s) 500, transform the computer from a general-purpose computing system into a special-purpose computer capable of implementing the configurations described herein. These computer-executable instructions transform the computing device(s) 500 by specifying how the CPUs 504 transition between states, as described above. According to one configuration, the computing device(s) 500 has access to computer-readable storage media storing computer-executable instructions which, when executed by the computing device(s) 500, perform the various processes described above. The computing device(s) 500 can also include computer-readable storage media storing executable instructions for performing any of the other computer-implemented operations described herein. Any of the computer-readable storage media depicted in FIG. 5 may be the same as, or similar to, the memory 122 of FIG. 1.

The computing device(s) 500 can also include one or more input/output controllers 524 for receiving and processing input from a number of input devices, such as a keyboard, a mouse, a touchpad, a touch screen, an electronic stylus, or other type of input device. Similarly, an input/output controller 524 can provide output to a display, such as a computer monitor, a flat-panel display, a digital projector, a printer, or other type of output device.

EXAMPLE CLAUSES

1. A method for determining whether a food product stored in a temperature-controlled storage receptacle is safe to ingest, the method comprising: receiving, from a first device within the temperature-controlled storage receptacle where the food product is stored, first data associated with the food product; receiving, from a second device within the temperature-controlled storage receptacle where the food product is stored, second data associated with the food product; determining, based at least in part on the first data and the second data, and using a data fusion model, a safety metric associated with the food product, the safety metric indicative of a probability of the food product being safe to ingest; and causing information to be output via a user device based at least in part on the safety metric, wherein the information indicates whether the food product is safe to ingest.
2. The method of clause 1, wherein: the first device comprises a camera; the first data comprises image data representing one or more images of the food product stored in the temperature-controlled storage receptacle; the second device comprises a temperature sensor; and the second data comprises temperature data indicating a temperature of the food product stored in the temperature-controlled storage receptacle.
3. The method of clause 2, wherein the metric is determined using a pathogen growth model that models growth of a pathogen in the food product as a function of temperature.
4. The method of any one of clauses 1 to 3, wherein: the first device comprises a camera; the first data comprises image data representing one or more images of the food product stored in the temperature-controlled storage receptacle; the second device comprises a gas sensor; and the second data comprises gas data indicating an odor of the food product stored in the temperature-controlled storage receptacle.
5. A system comprising: one or more processors; and memory storing computer-executable instructions that, when executed by the one or more processors, cause performance of operations comprising: receiving, from a first device within a storage receptacle where a food product is stored, first data associated with the food product; receiving second data associated with the food product; determining, based at least in part on the first data and the second data, a metric associated with the food product, the metric indicative of a probability of the food product being safe to ingest; and causing information to be output via a user device based at least in part on the metric, wherein the information indicates whether the food product is safe to ingest.
6. The system of clause 5, wherein the determining of the metric is based at least in part on a risk profile of a user.

7. The system of clause 5 or 6, wherein: the device within the storage receptacle comprises a camera; the first data comprises image data representing one or more images of the food product stored in the storage receptacle; the second data comprises gas data indicating an odor of the food product stored in the storage receptacle; and the gas data is received from a gas sensor within the storage receptacle.
8. The system of any one of clauses 5 to 7, wherein: the device within the storage receptacle comprises a temperature sensor; the first data comprises temperature data indicating a temperature of the food product stored in the storage receptacle; and the metric is determined using a pathogen growth model that models growth of a pathogen in the food product as a function of temperature.
9. The system of any one of clauses 5 to 8, wherein: the device within the storage receptacle comprises at least one of: a camera; or a gas sensor; the first data comprises at least one of: image data representing one or more images of the food product stored in the storage receptacle; or gas data indicating an odor of the food product stored in the storage receptacle; the second data comprises food production data associated with a food production process that was carried out to produce the food product; and the food production data is received from a second device within a facility where the food product was processed.
10. The system of any one of clauses 5 to 9, wherein the information further indicates a food preparation recommendation that uses the food product.
11. The system of clause 10, wherein the food preparation recommendation comprises one or more of: a recipe for a meal using the food product; a menu of one or more meals incorporating the food product; a suggested shopping list that includes a second food product or a food ingredient to acquire for use with the food product.
12. The system of any one of clauses 5 to 11, wherein the metric is a first metric, the operations further comprising determining, based at least in part on the first data and the second data, a second metric associated with the food product, the second metric indicative of a freshness of the food product, wherein the causing the information to be output is further based on the second metric, and wherein the information further indicates whether the food product is fresh.
13. The system of any one of clauses 5 to 12, wherein the metric is determined using a model of weights that: assigns a first weight to the first data, the first weight indicative of a reliability of the first data; assigns a second weight to the second data, the second weight indicative of a reliability of the second data; and computes the metric based at least in part on the first weight and the second weight.
14. A method comprising: receiving, from a first device within a storage receptacle where a food product is stored, first data associated with the food product; receiving second data associated with the food product; determining, based at least in part on the first data and the second data, a metric associated with the food product, the metric indicative of a probability of the food product being safe to ingest; and causing information to be output via a user device based at least in part on the metric, wherein the information indicates whether the food product is safe to ingest.
15. The method of clause 14, wherein: the device within the storage receptacle comprises a camera; the first data comprises image data representing one or more images of the food product stored in the storage receptacle; the second data comprises temperature data indicating a temperature of the food product stored in the storage receptacle; and the temperature data is received from a temperature sensor within the storage receptacle.
16. The method of clause 14 or 15, wherein the classifying of the food product comprises: the device within the storage receptacle comprises a gas sensor; the first data comprises gas data indicating an odor of the food product stored in the storage receptacle; the second data comprises temperature data indicating a temperature of the food product stored in the storage receptacle; and the temperature data is received from a temperature sensor within the storage receptacle.
17. The method of any one of clauses 14 to 16, wherein the information further indicates a food preparation recommendation that uses the food product.
18. The method of any one of clauses 14 to 17, wherein the determining of the metric is based at least in part on a risk profile of a user.
19. The method of any one of clauses 14 to 18, wherein: the metric comprises an expiration date of the food product; and the information further indicates the expiration date or a time remaining until the expiration date.
20. The method of any one of clauses 14 to 19, wherein: the device within the storage receptacle comprises a camera; the first data comprises image data representing one or more images of the food product stored in the storage receptacle; the method further comprises determining, based at least in part on the image data: a type of the food product; and a characteristic of the food product; and the determining of the metric is based at least in part on the type of the food product and the characteristic of the food product.
21. A method for determining whether an ingestible product stored in a temperature-controlled storage receptacle is safe to ingest, the method comprising: receiving, from a first device within the temperature-controlled storage receptacle where the ingestible product is stored, first data associated with the ingestible product; receiving, from a second device within the temperature-controlled storage receptacle where the ingestible product is stored, second data associated with the ingestible product; determining, based at least in part on the first data and the second data, and using a data fusion model, a safety metric associated with the ingestible product, the safety metric indicative of a probability of the ingestible product being safe to ingest; and causing information to be output via a user device based at least in part on the safety metric, wherein the information indicates whether the ingestible product is safe to ingest.
22. The method of clause 21, wherein: the first device comprises a camera; the first data comprises image data representing one or more images of the ingestible product stored in the temperature-controlled storage receptacle; the second device comprises a temperature sensor; and the second data comprises temperature data indicating a temperature of the ingestible product stored in the temperature-controlled storage receptacle.
23. The method of clause 22, wherein the metric is determined using a pathogen growth model that models growth of a pathogen in the ingestible product as a function of temperature.

24. The method of any one of clauses 21 to 23, wherein: the first device comprises a camera; the first data comprises image data representing one or more images of the ingestible product stored in the temperature-controlled storage receptacle; the second device comprises a gas sensor; and the second data comprises gas data indicating an odor of the ingestible product stored in the temperature-controlled storage receptacle.

25. A system comprising: one or more processors; and memory storing computer-executable instructions that, when executed by the one or more processors, cause performance of operations comprising: receiving, from a first device within a storage receptacle where an ingestible product is stored, first data associated with the ingestible product; receiving second data associated with the ingestible product; determining, based at least in part on the first data and the second data, a metric associated with the ingestible product, the metric indicative of a probability of the ingestible product being safe to ingest; and causing information to be output via a user device based at least in part on the metric, wherein the information indicates whether the ingestible product is safe to ingest.

26. The system of clause 25, wherein the determining of the metric is based at least in part on a risk profile of a user.

27. The system of clause 25 or 26, wherein: the device within the storage receptacle comprises a camera; the first data comprises image data representing one or more images of the ingestible product stored in the storage receptacle; the second data comprises gas data indicating an odor of the ingestible product stored in the storage receptacle; and the gas data is received from a gas sensor within the storage receptacle.

28. The system of any one of clauses 25 to 27, wherein: the device within the storage receptacle comprises a temperature sensor; the first data comprises temperature data indicating a temperature of the ingestible product stored in the storage receptacle; and the metric is determined using a pathogen growth model that models growth of a pathogen in the ingestible product as a function of temperature.

29. The system of any one of clauses 25 to 28, wherein: the device within the storage receptacle comprises at least one of: a camera; or a gas sensor; the first data comprises at least one of: image data representing one or more images of the ingestible product stored in the storage receptacle; or gas data indicating an odor of the ingestible product stored in the storage receptacle; the second data comprises production data associated with a production process that was carried out to produce the ingestible product; and the production data is received from a second device within a facility where the ingestible product was processed.

30. The system of any one of clauses 25 to 29, wherein the information further indicates a preparation recommendation that uses the ingestible product.

31. The system of clause 30, wherein the preparation recommendation comprises one or more of: a recipe for a meal using the ingestible product; a menu of one or more meals incorporating the ingestible product; a suggested shopping list that includes a second ingestible product or an ingredient to acquire for use with the ingestible product.

32. The system of any one of clauses 25 to 31, wherein the metric is a first metric, the operations further comprising determining, based at least in part on the first data and the second data, a second metric associated with the ingestible product, the second metric indicative of a freshness of the ingestible product, wherein the causing the information to be output is further based on the second metric, and wherein the information further indicates whether the ingestible product is fresh.

33. The system of any one of clauses 25 to 32, wherein the metric is determined using a model of weights that: assigns a first weight to the first data, the first weight indicative of a reliability of the first data; assigns a second weight to the second data, the second weight indicative of a reliability of the second data; and computes the metric based at least in part on the first weight and the second weight.

34. A method comprising: receiving, from a first device within a storage receptacle where an ingestible product is stored, first data associated with the ingestible product; receiving second data associated with the ingestible product; determining, based at least in part on the first data and the second data, a metric associated with the ingestible product, the metric indicative of a probability of the ingestible product being safe to ingest; and causing information to be output via a user device based at least in part on the metric, wherein the information indicates whether the ingestible product is safe to ingest.

35. The method of clause 34, wherein: the device within the storage receptacle comprises a camera; the first data comprises image data representing one or more images of the ingestible product stored in the storage receptacle; the second data comprises temperature data indicating a temperature of the ingestible product stored in the storage receptacle; and the temperature data is received from a temperature sensor within the storage receptacle.

36. The method of clause 34 or 35, wherein the classifying of the ingestible product comprises: the device within the storage receptacle comprises a gas sensor; the first data comprises gas data indicating an odor of the ingestible product stored in the storage receptacle; the second data comprises temperature data indicating a temperature of the ingestible product stored in the storage receptacle; and the temperature data is received from a temperature sensor within the storage receptacle.

37. The method of any one of clauses 34 to 36, wherein the information further indicates a preparation recommendation that uses the ingestible product.

38. The method of any one of clauses 34 to 37, wherein the determining of the metric is based at least in part on a risk profile of a user.

39. The method of any one of clauses 34 to 38, wherein: the metric comprises an expiration date of the ingestible product; and the information further indicates the expiration date or a time remaining until the expiration date.

40. The method of any one of clauses 34 to 39, wherein: the device within the storage receptacle comprises a camera; the first data comprises image data representing one or more images of the ingestible product stored in the storage receptacle; the method further comprises determining, based at least in part on the image data: a type of the ingestible product; and a characteristic of the ingestible product; and the determining of the metric is based at least in part on the type of the ingestible product and the characteristic of the ingestible product.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the disclosed techniques and systems in diverse forms thereof.

As will be understood by one of ordinary skill in the art, each implementation disclosed herein can comprise, consist essentially of or consist of its particular stated element, step, or component. Thus, the terms "include" or "including" should be interpreted to recite: "comprise, consist of, or consist essentially of." The transition term "comprise" or "comprises" means has, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the implementation to the specified elements, steps, ingredients or components and to those that do not materially affect the implementation. As used herein, the term "based on" is equivalent to "based at least partly on," unless otherwise specified.

What is claimed is:

1. A method for determining whether a food product stored in a temperature-controlled storage receptacle is safe to ingest, the method comprising:
   receiving, from a first device within the temperature-controlled storage receptacle where the food product is stored, first data associated with the food product;
   receiving, from a second device within the temperature-controlled storage receptacle where the food product is stored, second data associated with the food product;
   determining, based at least in part on the first data and the second data, a safety metric associated with the food product, the safety metric indicative of a probability of the food product being safe to ingest, wherein the safety metric is determined using a model of weights that:
      assigns a first weight to the first data, the first weight indicative of a reliability of the first data;
      assigns a second weight to the second data, the second weight indicative of a reliability of the second data; and
      computes the safety metric based at least in part on the first weight and the second weight; and
   causing information to be output via a user device based at least in part on the safety metric, wherein the information indicates whether the food product is safe to ingest.

2. The method of claim 1, wherein:
   the first device comprises a camera;
   the first data comprises image data representing one or more images of the food product stored in the temperature-controlled storage receptacle;
   the second device comprises a temperature sensor; and
   the second data comprises temperature data indicating a temperature of the food product stored in the temperature-controlled storage receptacle.

3. The method of claim 2, wherein the safety metric is determined using a pathogen growth model that models growth of a pathogen in the food product as a function of temperature.

4. The method of claim 1, wherein:
   the first device comprises a camera;
   the first data comprises image data representing one or more images of the food product stored in the temperature-controlled storage receptacle;
   the second device comprises a gas sensor; and
   the second data comprises gas data indicating an odor of the food product stored in the temperature-controlled storage receptacle.

5. The method of claim 1, wherein the determining of the safety metric is based at least in part on a risk profile of a user.

6. A system comprising:
   one or more processors; and
   memory storing computer-executable instructions that, when executed by the one or more processors, cause a performance of operations comprising:
      receiving, from a first device within a storage receptacle where a food product is stored, first data associated with the food product;
      receiving second data associated with the food product;
      determining, based at least in part on the first data and the second data, a metric associated with the food product, the metric indicative of a probability of the food product being safe to ingest, wherein the metric is determined using a model of weights that:
         assigns a first weight to the first data, the first weight indicative of a reliability of the first data;
         assigns a second weight to the second data, the second weight indicative of a reliability of the second data; and
         computes the metric based at least in part on the first weight and the second weight; and
      causing information to be output via a user device based at least in part on the metric, wherein the information indicates whether the food product is safe to ingest.

7. The system of claim 6, wherein the determining of the metric is based at least in part on a risk profile of a user.

8. The system of claim 6, wherein:
   the first device within the storage receptacle comprises a camera;
   the first data comprises image data representing one or more images of the food product stored in the storage receptacle;
   the second data comprises gas data indicating an odor of the food product stored in the storage receptacle; and
   the gas data is received from a gas sensor within the storage receptacle.

9. The system of claim 6, wherein:
   the first device within the storage receptacle comprises a temperature sensor;
   the first data comprises temperature data indicating a temperature of the food product stored in the storage receptacle; and
   the metric is determined using a pathogen growth model that models growth of a pathogen in the food product as a function of temperature.

10. The system of claim 6, wherein:
   the first device within the storage receptacle comprises at least one of:
      a camera; or
      a gas sensor;
   the first data comprises at least one of:
      image data representing one or more images of the food product stored in the storage receptacle; or
      gas data indicating an odor of the food product stored in the storage receptacle;
   the second data comprises food production data associated with a food production process that was carried out to produce the food product; and the food production data is received from a second device within a facility where the food product was processed.

11. The system of claim 6, wherein the information further indicates a food preparation recommendation that uses the food product.

12. The system of claim 11, wherein the food preparation recommendation comprises one or more of:
a recipe for a meal using the food product;
a menu of one or more meals incorporating the food product; or
a suggested shopping list that includes a second food product or a food ingredient to acquire for use with the food product.

13. The system of claim 6, wherein the metric is a first metric, the operations further comprising determining, based at least in part on the first data and the second data, a second metric associated with the food product, the second metric indicative of a freshness of the food product,
wherein the causing the information to be output is further based on the second metric, and
wherein the information further indicates whether the food product is fresh.

14. A method comprising:
receiving, from a first device within a storage receptacle where a food product is stored, first data associated with the food product;
receiving second data associated with the food product;
determining, based at least in part on the first data and the second data, a metric associated with the food product, the metric indicative of a probability of the food product being safe to ingest, wherein the metric is determined using a model of weights that:
assigns a first weight to the first data, the first weight indicative of a reliability of the first data;
assigns a second weight to the second data, the second weight indicative of a reliability of the second data; and
computes the metric based at least in part on the first weight and the second weight; and
causing information to be output via a user device based at least in part on the metric, wherein the information indicates whether the food product is safe to ingest.

15. The method of claim 14, wherein:
the first device within the storage receptacle comprises a camera;
the first data comprises image data representing one or more images of the food product stored in the storage receptacle;
the second data comprises temperature data indicating a temperature of the food product stored in the storage receptacle; and
the temperature data is received from a temperature sensor within the storage receptacle.

16. The method of claim 14, wherein:
the first device within the storage receptacle comprises a gas sensor;
the first data comprises gas data indicating an odor of the food product stored in the storage receptacle;
the second data comprises temperature data indicating a temperature of the food product stored in the storage receptacle; and
the temperature data is received from a temperature sensor within the storage receptacle.

17. The method of claim 14, wherein the information further indicates a food preparation recommendation that uses the food product.

18. The method of claim 14, wherein the determining of the metric is based at least in part on a risk profile of a user.

19. The method of claim 14, wherein:
the metric comprises an expiration date of the food product; and
the information further indicates the expiration date or a time remaining until the expiration date.

20. The method of claim 14, wherein:
the first device within the storage receptacle comprises a camera;
the first data comprises image data representing one or more images of the food product stored in the storage receptacle;
the method further comprises determining, based at least in part on the image data:
a type of the food product; and
a characteristic of the food product; and
the determining of the metric is based at least in part on the type of the food product and the characteristic of the food product.

* * * * *